US012671570B2

(12) United States Patent
Pal et al.

(10) Patent No.: US 12,671,570 B2
(45) Date of Patent: Jun. 30, 2026

(54) INCREASING THE SPEED OF HOMOMORPHIC ENCRYPTION ENCODING

(71) Applicant: International Business Machines Corporation, Armonk, NY (US)

(72) Inventors: Subhankar Pal, White Plains, NY (US); Nir Drucker, Zichron Yaakov (IL); Ehud Aharoni, Kfar Saba (IL)

(73) Assignee: International Business Machines Corporation, Armonk, NY (US)

( * ) Notice: Subject to any disclaimer, the term of this patent is extended or adjusted under 35 U.S.C. 154(b) by 56 days.

(21) Appl. No.: 18/791,566

(22) Filed: Aug. 1, 2024

(65) Prior Publication Data

US 2026/0039449 A1 Feb. 5, 2026

(51) Int. Cl.
 *H04L 9/00* (2022.01)
(52) U.S. Cl.
 CPC ........ *H04L 9/008* (2013.01); *H04L 2209/125* (2013.01)
(58) Field of Classification Search
 CPC .......................... H04L 9/008; H04L 2209/125
 See application file for complete search history.

(56) References Cited

U.S. PATENT DOCUMENTS

| | | | | |
|---|---|---|---|---|
| 7,039,121 B2 * | 5/2006 | Shin | ......................... | H04L 47/34 |
| | | | | 375/292 |
| 9,661,145 B2 * | 5/2017 | Gilg | ...................... | H04L 65/403 |
| 11,321,156 B1 * | 5/2022 | Bernatik | ............... | G06F 11/076 |
| 11,870,881 B2 * | 1/2024 | Khedr | ................... | H04L 9/0618 |

| | | | | |
|---|---|---|---|---|
| 2008/0075276 A1 * | 3/2008 | Sun | ........................ | H04L 9/3226 |
| | | | | 380/28 |
| 2011/0249907 A1 * | 10/2011 | Fukuhara | ............... | H04N 19/64 |
| | | | | 382/235 |
| 2014/0143281 A1 * | 5/2014 | Duan | .................... | G06F 16/211 |
| | | | | 707/798 |

(Continued)

FOREIGN PATENT DOCUMENTS

| | | |
|---|---|---|
| KR | 20230049575 A | 4/2023 |

OTHER PUBLICATIONS

Aharoni, Ehud et al., "HeLayers: A Tile Tensors Framework for Large Neural Networks on Encrypted Data", Proceedings on Privacy Enhancing Technologies 2023(1), Jul. 10-15, 2023, 18 pages.

(Continued)

*Primary Examiner* — Meng Li
(74) *Attorney, Agent, or Firm* — CANTOR COLBURN LLP; Anthony Mauricio Pallone

(57) ABSTRACT

Mechanisms are provided for increasing the speed of an encoding process. The mechanisms classify operations in the encoding process based on learned associations between patterns of input data and corresponding encoding result types generated from encoding the patterns of input data. The mechanisms identify operations in the encoding process that can be pruned based on the classifications, to thereby generate a set of prune operations. In addition, the mechanisms replace operations in the set of prune operations with replacement operations that retrieve a corresponding previously generated result. Moreover, the mechanisms emit optimized encoding code comprising the replacement operations in replacement of the set of prune operations that are pruned, for execution of the encoding process using the optimized encoding code.

20 Claims, 20 Drawing Sheets

CIPHERTEXT 1

| $X_0$ | $X_1$ | $X_2$ | $X_3$ | $X_4$ | $X_5$ | $X_6$ | $X_7$ |
|---|---|---|---|---|---|---|---|

110

CIPHERTEXT 2

| $W_0$ | $W_1$ | $W_2$ | $W_3$ | $W_4$ | $W_5$ | $W_6$ | $W_7$ |
|---|---|---|---|---|---|---|---|

120

CIPHERTEXT 3

| $X_0W_0$ | $X_1W_1$ | $X_2W_2$ | $X_3W_3$ | $X_4W_4$ | $X_5W_5$ | $X_6W_6$ | $X_7W_7$ |
|---|---|---|---|---|---|---|---|

130

(56)                 References Cited

U.S. PATENT DOCUMENTS

| | | | | |
|---|---|---|---|---|
| 2016/0180242 | A1* | 6/2016 | Byron | G06N 5/041 |
| | | | | 706/11 |
| 2017/0046449 | A1* | 2/2017 | Levi | G06F 8/443 |
| 2017/0134157 | A1* | 5/2017 | Laine | G09C 1/00 |
| 2018/0337775 | A1* | 11/2018 | Camenisch | H04L 9/30 |
| 2018/0375639 | A1* | 12/2018 | Lauter | H04L 9/008 |
| 2019/0044727 | A1* | 2/2019 | Scott | G06F 21/645 |
| 2019/0095277 | A1* | 3/2019 | Hegde | G06F 3/0641 |
| 2019/0121893 | A1* | 4/2019 | Fender | G06F 16/24534 |
| 2020/0151238 | A1* | 5/2020 | Jaber | G06F 17/142 |
| 2020/0151356 | A1* | 5/2020 | Rohloff | G06F 21/6245 |
| 2020/0228736 | A1* | 7/2020 | McElvain | H04N 25/571 |
| 2020/0403781 | A1* | 12/2020 | Gentry | H04L 9/0618 |
| 2021/0351913 | A1* | 11/2021 | No | H04L 9/008 |
| 2021/0397988 | A1* | 12/2021 | Sarpatwar | H04L 9/008 |
| 2022/0085970 | A1 | 3/2022 | Al Badawi et al. | |
| 2022/0300640 | A1* | 9/2022 | Shama | G06N 20/00 |
| 2023/0100930 | A1* | 3/2023 | Tan | G06N 3/063 |
| | | | | 706/25 |
| 2023/0208610 | A1* | 6/2023 | Shaul | G06F 21/00 |
| | | | | 380/28 |
| 2025/0015993 | A1* | 1/2025 | Wang | H04L 9/12 |
| 2025/0315226 | A1* | 10/2025 | Kim | G06F 8/41 |

OTHER PUBLICATIONS

Belorgey, M.G. et al., "Revisiting Key Decomposition Techniques for FHE: Simpler, Faster and More Generic", Cyrptology ePrint Archive, Paper 2023/771, May 26, 2023, 43 pages.

Chen, Jianping et al., "An Efficient FFT Algorithm for Real-Symmetric Data", Proceedings of the 1992 IEEE International Conference on Acoustics, Speech, and Signal Processing (ICASSP-92:), Mar. 23-26, 1992, 4 pages.

Chen, Gui-Lin et al., "On Performance of Sparse Fast Fourier Transform and Enhancement Algorithm", IEEE Transactions on Signal Processing, vol. 65, No. 21, Nov. 1, 2017, 14 pages.

Cheon, Jung Hee et al., "Homomorphic Encryption for Arithmetic of Approximate Numbers", International Association for Cryptologic Research, Asiacrypt 2017, Part I, LNCS 10624, Dec. 3-7, 2017, 29 pages.

Cooley, James W. et al., "An Algorithm for the Machine Calculation of Complex Fourier Series", Mathematics of Computation, vol. 19., May 1, 1965, 5 pages.

Duhamel, Pierre et al., "Implementation of "Split-Radix" FFT Algorithms for Complex, Real, and Real-Symmetric Data", IEEE International Conference on Acoustics, Speech, and Signal Processing, ICASSP '85, Apr. 26-29, 1985, 4 pages.

Gentleman, W.M. et al., "Fast Fourier Transforms-For Fun and Profit", Proceedings of the Fall Joint Computer Conference, AFIPS '66 (Fall), Nov. 7-10, 1966, 16 pages.

Halevi, Shai et al., "Homomorphic Encryption", Springer International Publishing AG, Chapter 5, Lindell, Y. (eds) Tutorials on the Foundations of Cryptography. Information Security and Cryptography. Springer, Cham. https://doi.org/10.1007/978-3-319-57048-8_5, Apr. 6, 2017, 58 pages.

Kim, Duhyeong et al., "Approximate Homomorphic Encryption over the Conjugate-invariant Ring", Proceedings of the 21st International Conference on Information Security and Cryptology (ICISC 2018: 85-102), Nov. 28-30, 2018, 18 pages.

Molahosseini, Amir S. et al., "Exploiting Data Redundancy in CKKS Encoding for High-Speed Homomorphic Encryption", 19th ACM Asia Conference on Computer and Communications Security (Asia CCS'24), Jul. 1-5, 2024, 13 pages.

Rajaby, Elias et al., "A structured review of sparse fast Fourier transform algorithms", Elsevier Inc., Digital Signal Processing, vol. 123 (2022) 103403, Apr. 30, 2022, 14 pages.

Schumacher, Jorn et al., "High-Performance Sparse Fast Fourier Transforms", 2014 IEEE Workshop on Signal Processing Systems (SiPS), Oct. 20-22, 2014, 6 pages.

* cited by examiner

| | | |
|---|---|---|
| $W_{0,0}$ | $W_{1,0}$ | $W_{2,0}$ |
| $W_{0,1}$ | $W_{1,1}$ | $W_{2,1}$ |
| $W_{0,2}$ | $W_{1,2}$ | $W_{2,2}$ |
| $W_{0,3}$ | $W_{1,3}$ | $W_{2,3}$ |
PACK COLUMN-WISE
| | | |
|---|---|---|
| $W_{0,0}$ | $W_{1,0}$ | $W_{2,0}$ |
| $W_{0,1}$ | $W_{1,1}$ | $W_{2,1}$ |
| $W_{0,2}$ | $W_{1,2}$ | $W_{2,2}$ |
| $W_{0,3}$ | $W_{1,3}$ | $W_{2,3}$ |
*FIG. 2A*
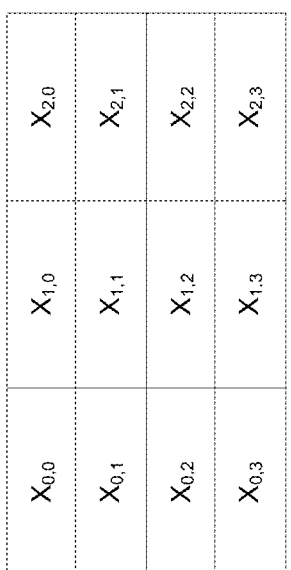
| | | |
|---|---|---|
| $X_{0,0}$ | $X_{1,0}$ | $X_{2,0}$ |
| $X_{0,1}$ | $X_{1,1}$ | $X_{2,1}$ |
| $X_{0,2}$ | $X_{1,2}$ | $X_{2,2}$ |
| $X_{0,3}$ | $X_{1,3}$ | $X_{2,3}$ |
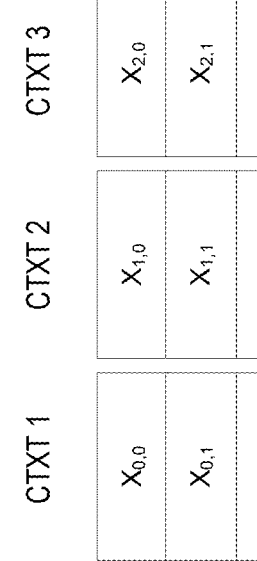
| CTXT 1 | CTXT 2 | CTXT 3 |
|---|---|---|
| $X_{0,0}$ | $X_{1,0}$ | $X_{2,0}$ |
| $X_{0,1}$ | $X_{1,1}$ | $X_{2,1}$ |
| $X_{0,2}$ | $X_{1,2}$ | $X_{2,2}$ |
| $X_{0,3}$ | $X_{1,3}$ | $X_{2,3}$ |
| 210 | 220 | 230 |

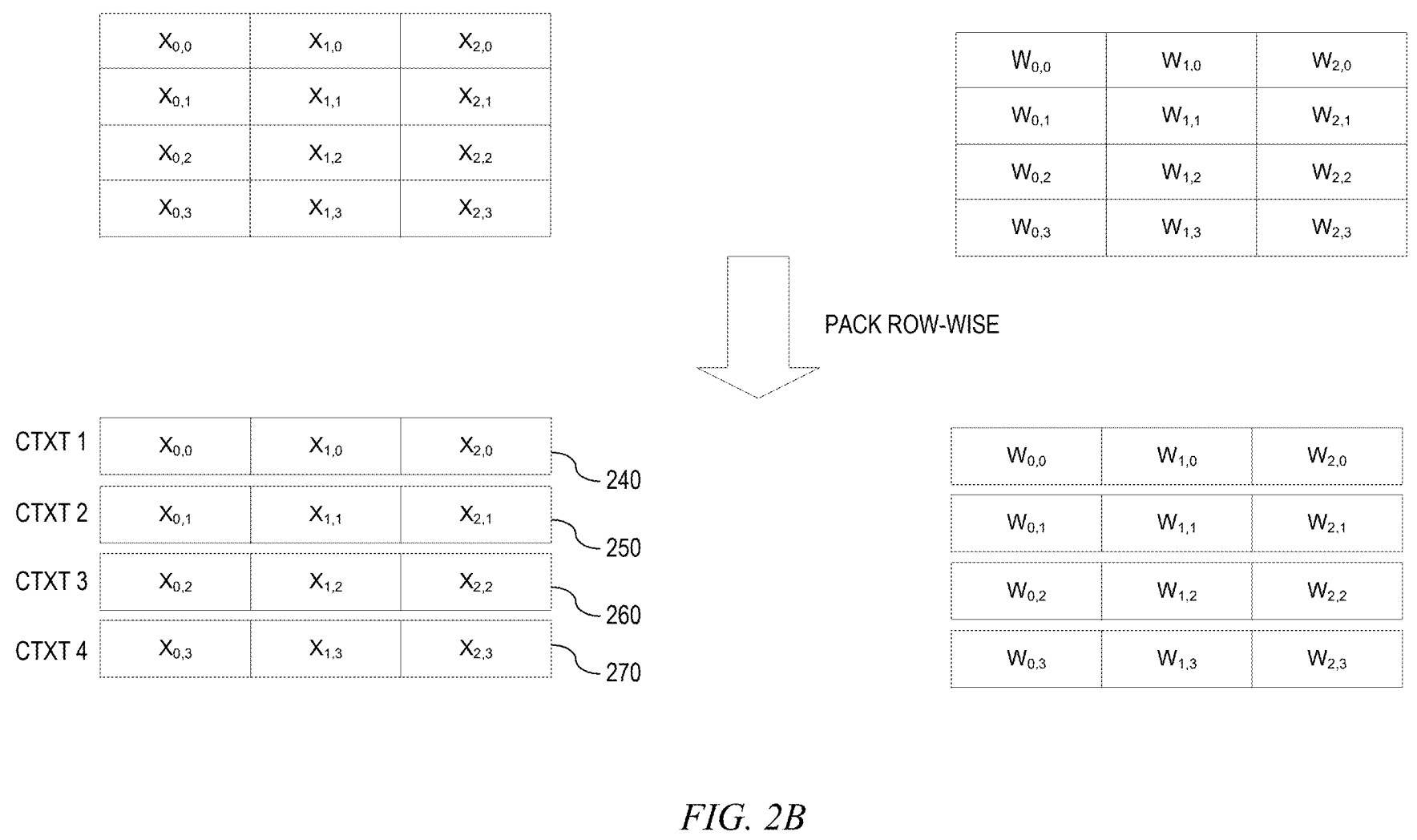

PACK ROW-WISE

| | | |
|---|---|---|
| $W_{0,0}$ | $W_{1,0}$ | $W_{2,0}$ |
| $W_{0,1}$ | $W_{1,1}$ | $W_{2,1}$ |
| $W_{0,2}$ | $W_{1,2}$ | $W_{2,2}$ |
| $W_{0,3}$ | $W_{1,3}$ | $W_{2,3}$ |

| $X_{0,0}$ | $X_{1,0}$ | $X_{2,0}$ |
|---|---|---|
| $X_{0,1}$ | $X_{1,1}$ | $X_{2,1}$ |
| $X_{0,2}$ | $X_{1,2}$ | $X_{2,2}$ |
| $X_{0,3}$ | $X_{1,3}$ | $X_{2,3}$ |

CTXT 1   240
CTXT 2   250
CTXT 3   260
CTXT 4   270

FIG. 2B

Data
Index

| 0 | 0.264+ 0.000j | ⟶ | 283470923 |
| 1 | ~0.058+ 0.000j | ⟶ | ~62148384 |
| 2 | 0.000+ 0.000j | ⟶ | 0 |
| 3 | 0.000+ 0.000j | ⟶ | 0 |
| 4 | 0.000+ 0.000j | ⟶ | 0 |
| 5 | 0.000+ 0.000j | ⟶ | 0 |
| 6 | 0.000+ 0.000j | ⟶ | 0 |
| 7 | 0.000+ 0.000j | ⟶ | 0 |
| 8 | ~0.116+ 0.000j | ⟶ | ~124345565 |
| 9 | 0.088+~0.000j | ⟶ | 94257810 |
| 10 | ~0.060+ 0.000j | ⟶ | ~64027446 |
| 11 | ~0.008+ 0.000j | ⟶ | ~8812499 |
| 12 | ~0.058+ 0.000j | ⟶ | ~62526044 |
| 13 | 0.015+~0.000j | ⟶ | 16360555 |
| 14 | ~0.125+ 0.000j | ⟶ | ~134667849 |
| 15 | ~0.073+ 0.000j | ⟶ | ~78809420 |

Optimizations
Zero indices:
• 2
• 3
• 4
• 5
• 6
• 7

*FIG. 10*

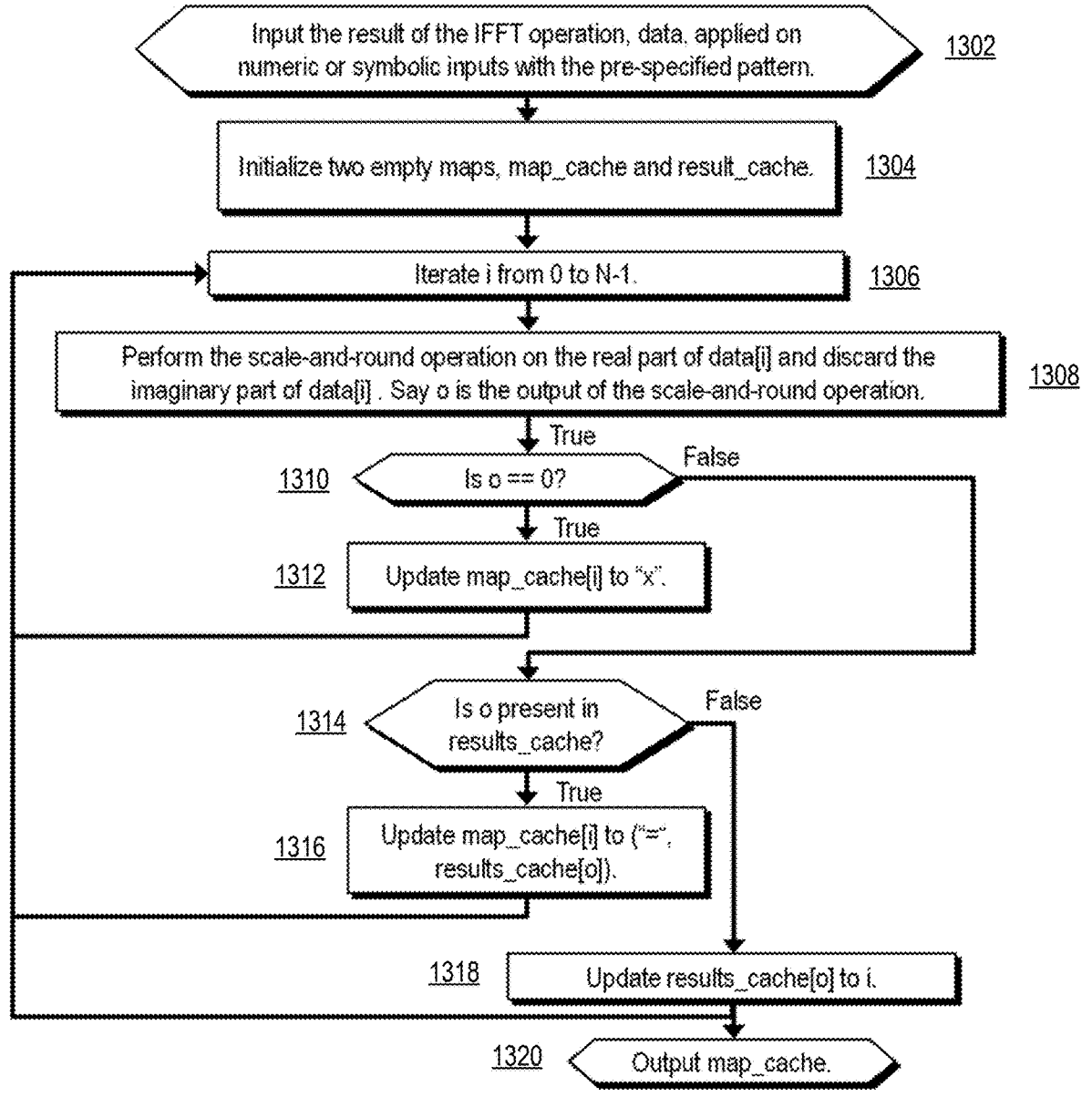

1302 Input the result of the IFFT operation, data, applied on numeric or symbolic inputs with the pre-specified pattern.

1304 Initialize two empty maps, map_cache and result_cache.

1306 Iterate i from 0 to N-1.

1308 Perform the scale-and-round operation on the real part of data[i] and discard the imaginary part of data[i] . Say o is the output of the scale-and-round operation.

1310 Is o == 0?

1312 Update map_cache[i] to "x".

1314 Is o present in results_cache?

1316 Update map_cache[i] to ("=", results_cache[o]).

1318 Update results_cache[o] to i.

1320 Output map_cache.

*FIG. 13*

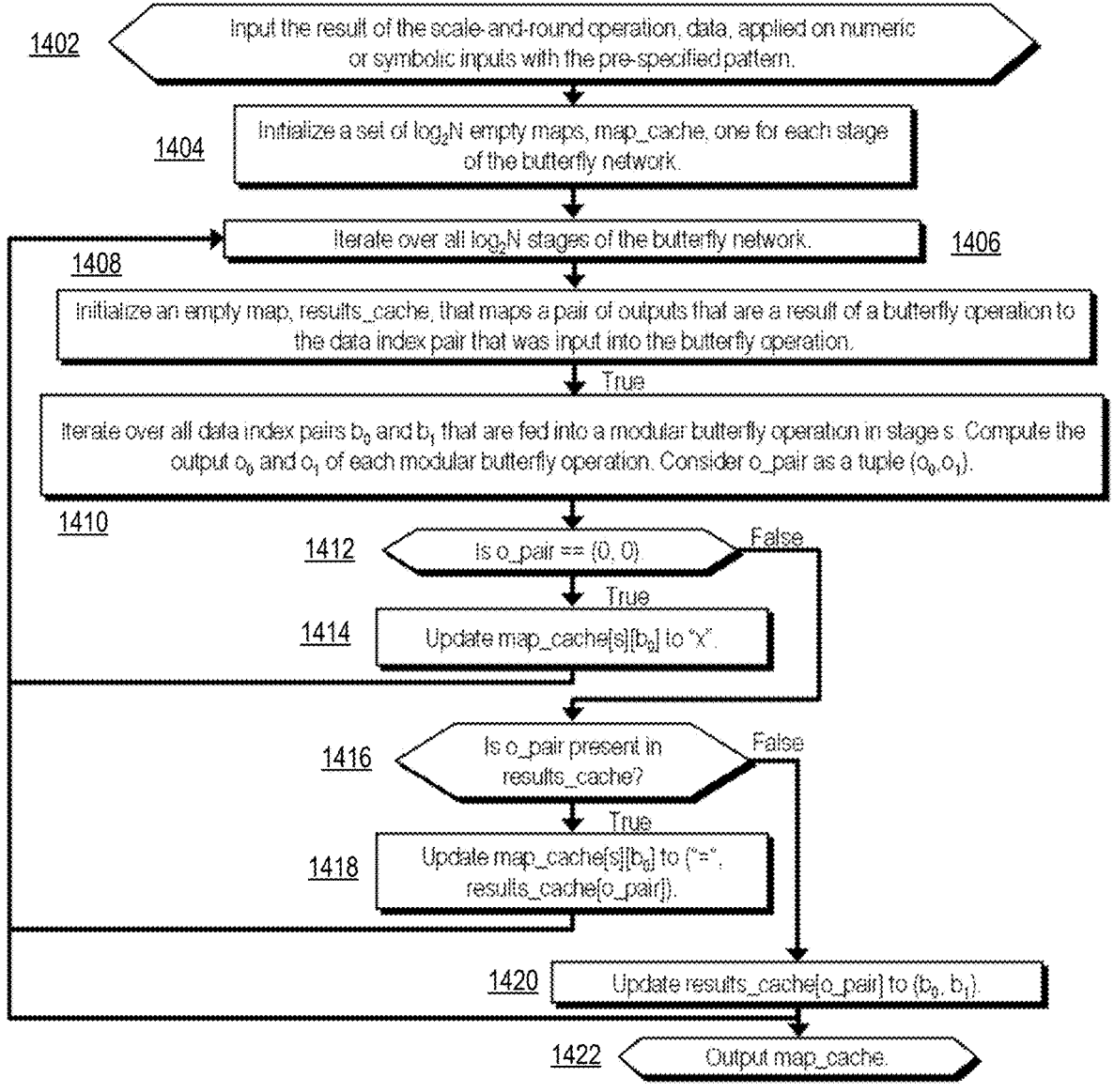

1402    Input the result of the scale-and-round operation, data, applied on numeric or symbolic inputs with the pre-specified pattern.

1404    Initialize a set of $\log_2 N$ empty maps, map_cache, one for each stage of the butterfly network.

Iterate over all $\log_2 N$ stages of the butterfly network.    1406

1408    Initialize an empty map, results_cache, that maps a pair of outputs that are a result of a butterfly operation to the data index pair that was input into the butterfly operation.

True

Iterate over all data index pairs $b_0$ and $b_1$ that are fed into a modular butterfly operation in stage s. Compute the output $o_0$ and $o_1$ of each modular butterfly operation. Consider o_pair as a tuple $(o_0, o_1)$.

1410

1412    Is o_pair == (0, 0)    False

True

1414    Update map_cache[s][$b_0$] to "X".

1416    Is o_pair present in results_cache?    False

True

1418    Update map_cache[s][$b_0$] to {"=", results_cache[o_pair]}.

1420    Update results_cache[o_pair] to $(b_0, b_1)$.

1422    Output map_cache.

*FIG. 14*

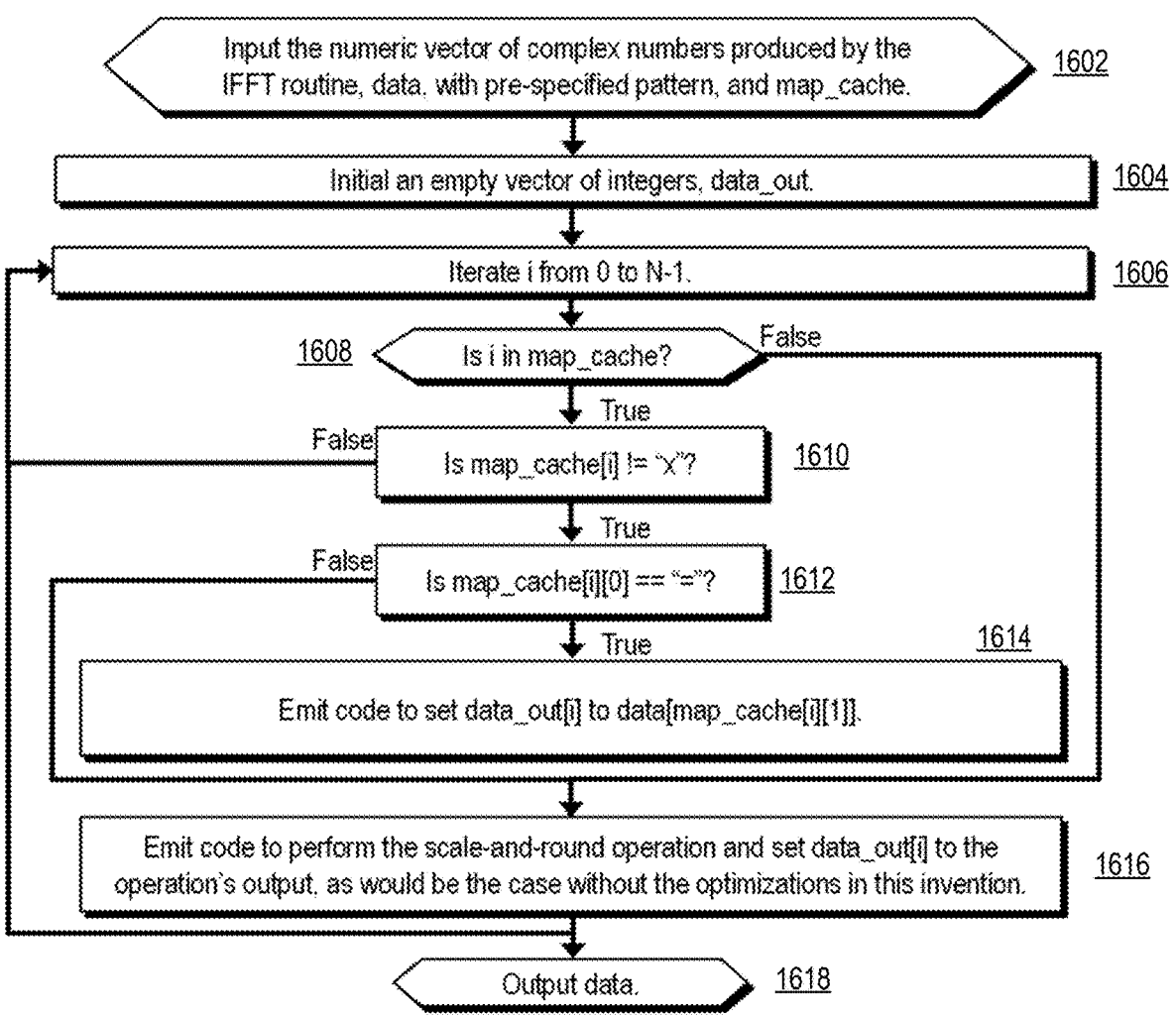

Input the numeric vector of complex numbers produced by the IFFT routine, data. with pre-specified pattern, and map_cache.          1602

Initial an empty vector of integers, data_out.          1604

Iterate i from 0 to N-1.          1606

1608          Is i in map_cache?          False

True

False          Is map_cache[i] != "x"?          1610

True

False          Is map_cache[i][0] == "="?          1612

True          1614

Emit code to set data_out[i] to data[map_cache[i][1]].

Emit code to perform the scale-and-round operation and set data_out[i] to the operation's output, as would be the case without the optimizations in this invention.          1616

Output data.          1618

*FIG. 16*

INCREASING THE SPEED OF HOMOMORPHIC ENCRYPTION ENCODING

BACKGROUND

The present application relates generally to an improved data processing apparatus and method and more specifically to an improved computing tool and improved computing tool operations/functionality for increasing the speed of homomorphic encryption encoding.

Cybersecurity is a critical issue in modern computer environments. Each day, new reports are made of attackers breaching computer security measures and gaining access to private or confidential data, such as customer names, contact information, financial information, and the like. Moreover, increasing numbers of events are occurring where attackers infiltrate computing systems and hold the computing system or access to data hostage until a ransom is paid. Thus, improvements to the security of computing systems and data are an ever changing area of technology.

Security of data is especially a concern as individuals and organizations move from an on-site computing infrastructure and local applications/data based architecture to a more distributed and cloud infrastructure/service based architecture where third parties are enlisted to perform processing of individual/organization data. At various points in the cloud architecture, e.g., if a cloud architecture performs data processing on unencrypted data, i.e., "in the clear", sensitive information may be leaked. This can be a significant issue as increasing individuals and organizations rely increasingly on cloud architectures.

Homomorphic encryption (HE) mechanisms offer tools to help ensure security of data when using off-site, e.g., cloud based, services to perform operations on the data. HE provides mechanisms to perform certain operations on encrypted data without having to have access to the plaintext of the data.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a computer-implemented method, in a data processing system, for increasing the speed of an encoding process is provided. The computer-implemented method comprises classifying operations in the encoding process based on learned associations between patterns of input data and corresponding encoding result types generated from encoding the patterns of input data. The method further comprises identifying operations in the encoding process that can be pruned based on the classifications, to thereby generate a set of prune operations. In addition, the method comprises replacing operations in the set of prune operations with replacement operations that retrieve a corresponding previously generated result. Moreover, the method comprises emitting optimized encoding code comprising the replacement operations in replacement of the set of prune operations that are pruned, for execution of the encoding process using the optimized encoding code.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 2A is an example diagram illustrating an example single-instruction-multiple-data (SIMD) packing in which a tensor is packed with ciphertexts column-wise;

FIG. 2B is an example diagram illustrating an example single-instruction-multiple-data (SIMD) packing in which a tensor is packed with ciphertexts row-wise;

FIG. 10 illustrates an example scale-and-round operation in accordance with one illustrative embodiment;

FIG. 13 is a flowchart outlining an example operation of the encoding optimizer for emitting optimized scale-and-round code as part of an offline operation in accordance with one illustrative embodiment;

FIG. 14 is a flowchart outlining an example operation of the encoding optimizer for emitting optimized NTT code as part of an offline operation in accordance with one illustrative embodiment;

FIG. 16 is a flowchart outlining an example operation of an encoder for emitting optimized scale-and-round execution code as part of an online operation in accordance with one illustrative embodiment.

DETAILED DESCRIPTION

Figure 1A:
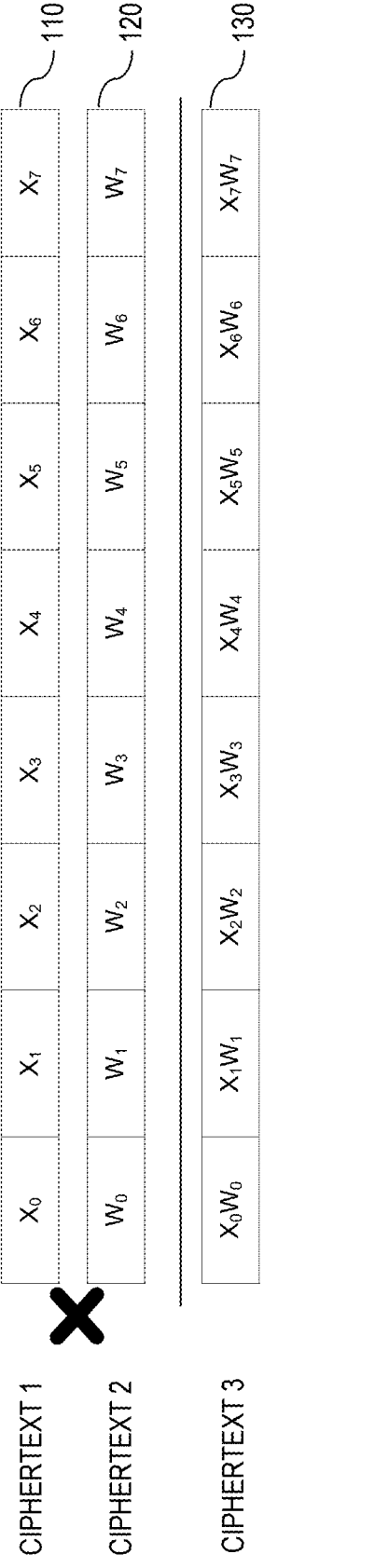
FIGS. 1A and 1B are diagrams illustrating slot-wise operations performed on example ciphertexts in a scheme that supports single-instruction-multiple-data (SIMD)

The illustrative embodiments provide an improved computing tool and improved computing tool operations/functionality for increasing the speed of homomorphic encryption (HE) encoding of structured data. In particular, the mechanisms of the illustrative embodiments learn patterns of input values that correspond to optimizations that may be performed that reduce the computational overhead of the encoding by eliminating computations that result in known values, e.g., zeroes, duplicates of prior computations, or conjugates of prior computations. Such instances are replaced (pruned or skipped) and replaced with a copy or copy-conjugate from the associated place where these values were previously computed. For zeroes, the computation is pruned and assigned a zero value. In HE encoding, as described in greater detail hereafter, such patterns have been found to exist more prevalently than in other domains, such that their existence can be leveraged to perform such optimizations in accordance with the illustrative embodiments.

The illustrative embodiments will be described with regard to example embodiments in which HE computer operations are performed by the mechanisms of the illustrative embodiments. Thus, it is first helpful to understand what a HE scheme entails. A HE scheme is a cryptographic system that allows its users, e.g., clients, to evaluate any "circuit" on encrypted data using the four methods (described in greater detail below): Gen, Enc, Dec, Eval. The "circuit" is the group of computations or calculations that are to be performed on the encrypted data using HE. That is, for example, one may want to perform a particular operation on input data, where this operation may require a plurality of HE computations to be performed in series and/or parallel to ultimately generate one or more results corresponding to the requested operation. These HE computations may be represented as a graph of nodes and edges proceeding from inputs to one or more outputs with intermediate nodes and intermediate ciphertexts being generated as a result of the HE computations performed at the various stages along the graph. For example, edges in a graph may represent HE computations and nodes in the graph may represent ciphertexts. The combination of these nodes and edges may be considered a "circuit" that defines the various HE input ciphertext(s), the intermediate ciphertext(s), and the output ciphertext(s). These combinations of HE compute operations and resulting ciphertext(s) are referred to as a circuit as the operations of a circuit are not dependent on the particular inputs, e.g., there are no conditional operations, as the inputs are encrypted, and are performed on the inputs to the circuit, similar to classic electrical circuits.

With an HE scheme, a client, e.g., a user of a computing device, a computing process executing on a computing device, or the like (hereafter simply a "client"), can use the key generation method (Gen) to generate a pair of secret and public keys (sk, pk), where the "client" is a client to a HE service provider that provides an HE service, such as a cloud computing HE service or the like, via one or more computing systems, e.g., servers. The client stores the secret key (sk) and publishes the public key (pk).

Using the public key (pk), an untrusted entity can encrypt sensitive data (or a "message") $m_i$ by calling the encryption method (Enc), e.g., $c_i = Enc\_pk(m_i)$. Subsequently, the client can ask the untrusted entity to execute the function $c\_res = Eval\_pk(f,(c_1, \ldots, c_n))$ in order to evaluate a function f on some ciphertexts $c_i$ and store the results in another results ciphertext c_res. To decrypt c_res using the secret key (sk), the client calls the decryption method (Dec), e.g., $m\_res = Dec\_sk(c\_res)$, where m_res is the resulting decrypted message corresponding to the ciphertext c_res which has been decrypted using the secret key (sk). A HE scheme is correct when m=Dec(Enc(m)) and is approximately correct when m=Dec(Enc(m))+epsilon, for some relatively small epsilon. The "Eval" receives an HE circuit and ciphertext(s) and evaluates the circuit with the given ciphertext(s) as inputs as to whether they are correct or not. "Eval" also receives an evaluation key which is different than the public key generated during the keygen phase.

Some HE schemes operate on ciphertexts in a homomorphic single instruction multiple data (SIMD) fashion. This means that a single ciphertext encrypts a fixed-size vector, and the homomorphic operations on the ciphertext are performed slot-wise on the elements of the plaintext vector, where "slot-wise" refers to each of the vector slots of the vector and means that the operations are performed on a vector slot by vector slot basis. For example, as shown in FIG. 1A, a first ciphertext 110 may be packed with a first vector of elements in one ciphertext, i.e., x0 to x7, where each element is in a vector slot. Similarly, a second ciphertext 120 may be packed with a second vector of elements in one ciphertext, i.e., w0 to w7. In the context of an HE operation, these elements are encrypted data. Addition and multiplication operations, for example, may then be performed on these ciphertext in a slot-wise manner so as to generate a result ciphertext 130, in which each vector slot of the ciphertext 130 comprises the product or sum of the corresponding vector slots of the first and second ciphertexts 110-120.

Figure 1B:
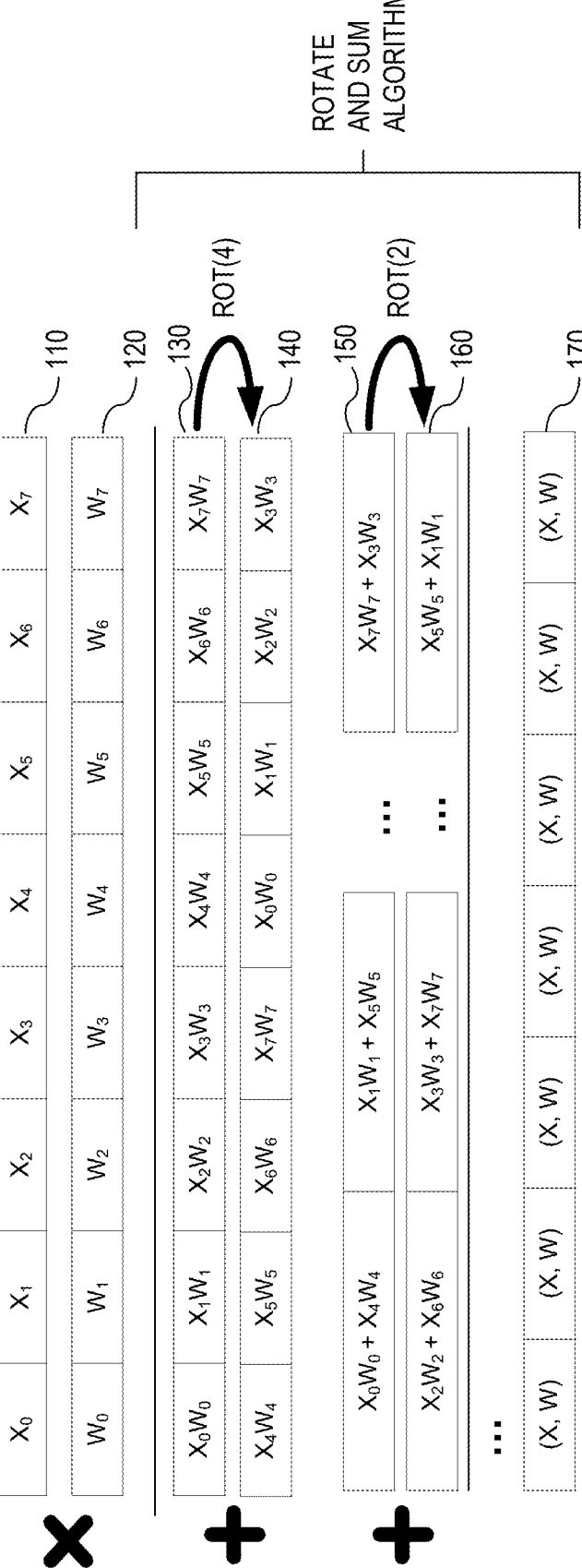

Other operations may be achieved by a combination of multiplication and addition operations with some rotation operations. Rotation operations rotate the vector slots by a specified number of vector slots, wrapping at the ends of the vectors. FIG. 1B illustrates a rotate and sum algorithm that is performed on the result vector 130 generated from the multiplication of the first and second ciphertexts (or vectors) 110-120. An operation such as that shown in FIG. 1B, may be used, for example, to obtain an inner product of the two ciphertexts 110-120. As shown in FIG. 1B, after obtaining the result ciphertext (or vector) 130 in the manner shown in FIG. 1A, a rotation of 4 slots, i.e., Rot(4), to obtain the rotated ciphertext 140 which is then added to the result ciphertext 130. Thereafter, a rotation operation of 2 slots is performed on the result ciphertext 150 is performed to generate the rotated ciphertext 160 which is then added to the result ciphertext 150. These are referred to as rotate and sum (RaS) algorithms, and will ultimately result in an output ciphertext 170 which may represent, for example, an inner product of the original input ciphertexts 110-120.

SIMD HE mechanisms may utilize tensors and tile tensors to achieve parallel execution of operations on a plurality of vectors of ciphertexts. A tensor is a mathematical object that describes a multilinear relationship between sets of algebraic objects related to a vector space. Tensors generalize the concept of scalars, vectors, and matrices to higher dimensions. In the context of data science, tensors are multidimensional data structures used to represent and store complex data upon which computations are performed. Machine learning mechanisms, such as TensorFlow® (a trademark of Google, LLC). and PyTorch® (a trademark of the Linux Foundation), utilize tensors to perform machine learning operations and train machine learning computer models, e.g., neural networks.

Tensors have various attributes that describe the tensor including a rank, shape, and data type. Tensors have a "rank" which indicates the number of dimensions represented by the tensor, e.g., rank 1 is a vector tensor, rank 2 is a matrix, etc. The "shape" of a tensor refers to the size of each of the dimensions of the tensor, e.g., a matrix with 4 rows and 4 columns would have a shape of (4, 4). The "data type" of a tensor refers to the types of values stored in the tensor, e.g., int64 or float32.

Tile tensors are a data structure that makes packing easier. Tile tensors are a data structure that allows clients to store tensors with arbitrary sizes and shapes. The tile tensor packs tensor data into a collection of vectors of fixed size and a set of operators are defined for manipulating the tensor in its packed form. Tile tensors may be used to provide homomorphic encryption (HE) environments where the data values stored in the tensors may be encrypted data values and the tile tensor operators permit the performance of HE operations on such encrypted data.

As is shown in the examples of FIGS. 1A-1B, in order to fully utilize the performance improvements obtainable from SIMD execution, the ciphertexts, and the corresponding tensors or tile tensors, should be packed and encrypted such that more than one input element is present in every ciphertext and thus, multiple parallel executions on different vector slots may be performed. However, the packing method can dramatically affect the latency (i.e., time to perform computation), throughput (i.e., number of computations performed in a unit of time), communication costs, and memory requirements in order to perform the HE SIMD operation.

For example, FIG. 2A shows an example SIMD packing in which a tensor is packed with ciphertexts column-wise, e.g., each two dimensional matrix tensor may have each column correspond to a different input vector, e.g., ciphertext 1 210 having encrypted data elements $x_{0,0}$ to $x_{0,3}$, ciphertext 2 220 having encrypted data elements $x_{1,0}$ to $x_{1,3}$, and ciphertext 3 230 having encrypted data elements $x_{2,0}$ to $x_{2,3}$ in this example. As shown in FIG. 2B, the SIMD packing may also be performed row-wise, e.g., each two dimensional matrix tensor may have each row correspond to a ciphertext of particular data elements from vector slots of the input ciphertexts. For example, as shown in FIG. 2B, ciphertext 1 240 may comprise the first encrypted data element from each of the input ciphertexts, e.g., $x_{0,0}$, $x_{1,0}$, and $x_{2,0}$. A second ciphertext 2 250 may comprise the second encrypted data element from each of the input ciphertexts, e.g., $x_{0,1}$, $x_{1,1}$, and $x_{2,1}$. This continues with the third and fourth ciphertexts 260, 270.

Figure 3:
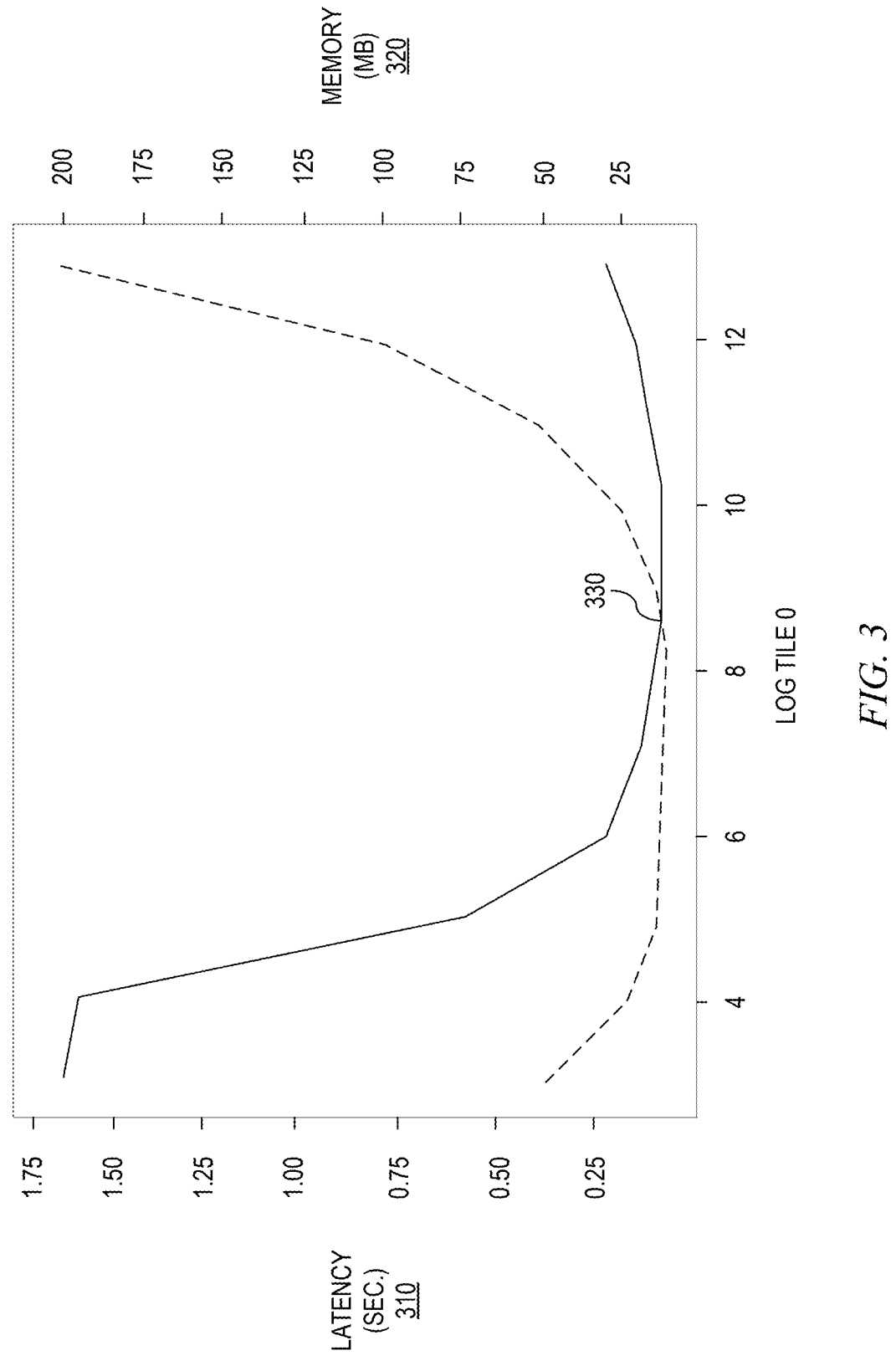
FIG. 3 is an example plot of the performance of a SIMD homomorphic encryption (HE) operation for various packing methods.

These two packing methods, i.e., column-wise and row-wise, represent the two extremes for packing a matrix tensor for SIMD HE operations. Other types of SIMD packing may also be possible with differing levels of performance, such as with regard to latency of the SIMD HE operation and memory utilization. For example, as shown in FIG. 3, if one plots the performance of the SIMD HE operation for various packing methods, one gets a graph as shown in FIG. 3 where the vertical axis represents latency and memory usage, and the horizonal axis represents different types of packing. As can be seen from FIG. 3, for a given SIMD HE operation, there is a point 330 where latency 310 and memory usage 320 intersect at a low point such that the particular packing at that point represents the optimum packing for achieving a low latency and low memory usage solution. Thus, one can fix a metric, e.g., an amount of memory or a tolerable latency, and a corresponding packing may be selected that achieves an optimum other metric, e.g., fixing an amount of available memory and selecting a packing that gives a lowest latency or fixing the tolerable latency and selecting a packing that requires the smallest amount of memory.

Thus, the particular packing methodology used can greatly impact performance of the SIMD HE operation. That is, if the data is not packed appropriately into the ciphertexts, or vectors of encrypted data, as described hereafter, then data movements between compute devices will be needed, which increases latency and memory utilization, and will impact performance overall.

Tile tensors are a data structure that makes packing easier. Tile tensors are a data structure that allows clients to store tensors with arbitrary sizes and shapes. The tile tensor packs tensor data into a collection of vectors of fixed size and a set of operators are defined for manipulating the tensor in its packed form. Tile tensors may be used to provide homomorphic encryption (HE) environments where the data values stored in the tensors may be encrypted data values and the tile tensor operators permit the performance of HE operations on such encrypted data.

Figure 4:
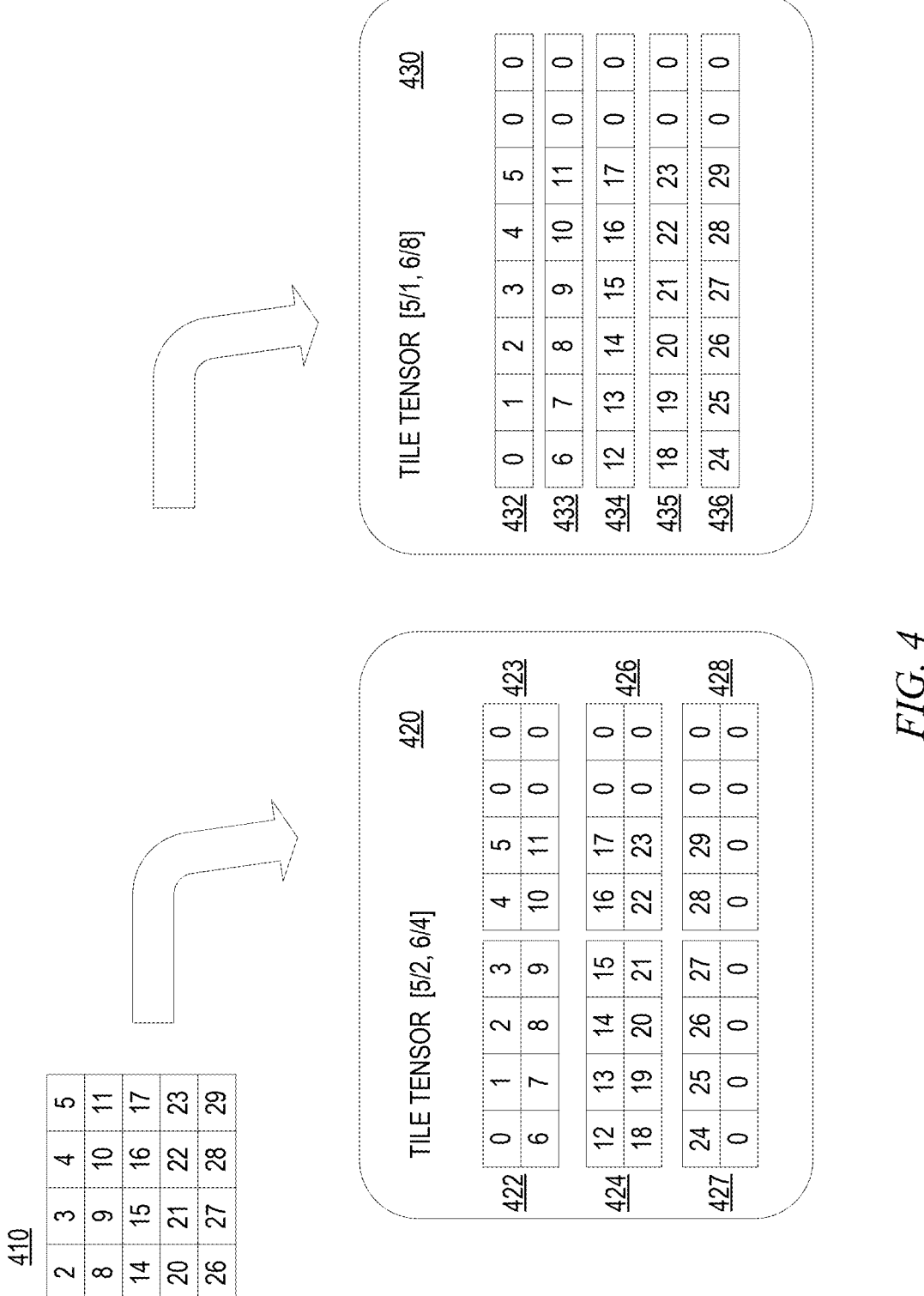
FIG. 4 is an example diagram illustrating different packings of an input tensor into tile tensors having different tile tensor shapes.

The shape of the tile tensor results in different packings. For example, as shown in the depiction of FIG. 4, the same tensor 410 may be packed differently into two different tile tensor shapes 420 and 430. For example, as shown in FIG. 4, the original tensor 410 is a 5×6 matrix of encrypted data elements 0 through 29. If one is to pack these data elements into a tile tensor 420, where each tile in the tile tensor 420 has a size of 2×4 (2 rows and 4 columns), then portions of each row of the original tensor 410 will need to be in separate tiles and the last row will only partially fill their respective tiles. A tile tensor's shape is represented by a tuple of fractional values, e.g., [5/2, 6/4] for tile tensor 420 or [5/1, 6/8]. The numerator in the fractional values represents the size of the input tensor 410, i.e., 5×6 in this example. The denominator in the fractional values represents the number of vector slots of the tensors of the tile tensor, i.e., 2×4 for tile tensor 420 and 1×8 for tile tensor 430 in this example. Tiles that are not completely filled with data elements from the input tensor 410 are padded with null values as shown in FIG. 4. It should be appreciated that the dimensions of the tile tensors 420 and 430 overall are 6×8 for tile tensor 420 and 5×8 for tile tensor 430.

Thus, if one is to use the tile tensor 420, due to the shape (2×4) of the tensors in the tile tensor 420, the rows of the input tensor 410 extend from one tile tensor 422 to another 423, 424 to 426, and 427 to 428, with appropriate padding with null values. Alternatively, if packing the data elements from 410 into a tile tensor 430, due to its shape (1×8), each row may be packed into a separate tensor 432-436. If one considers that in a SIMD HE operation, different portions of the tile tensors 420, 430 are processed by different devices, depending on the particular number of devices available, different packings will result in more or less efficient performance, depending on the level of parallelization achievable, as discussed in greater detail hereafter.

In addition to the packing methodology used to pack the tile tensors for subsequent HE operations, the encoding process used to encode the private data for encryption by the HE mechanisms such that the resulting ciphertexts may be packed into the tile tensors also significantly affects performance. In fact, it has been found that, in some instances, the encoding operations for HE may constitute approximately 35% of the overall processing time for encoding and encrypting the plaintext data for HE operations. This is especially a concern when one recognizes that HE operations are costly in terms of performance, being approximately 3-5 orders of magnitude slower than corresponding plaintext operations and thus, any performance improvements to HE operations would be greatly beneficial. Moreover, HE operations have larger memory requirements, e.g., 100 times the memory requirement, over plaintext processing for the same amount of data. Thus, it would be beneficial to be able to improve the speed at which such encoding can be performed, and if possible reduce the memory requirement for performing such HE operations. The illustrative embodiments provide such beneficial improvements.

The illustrative embodiments provide an improved computing tool and improved computing tool operations for improving the speed by which data is encoded for HE operations. The illustrative embodiments learn correlations between patterns in input data and encoding result types generated from encoding the data in these patterns, so as to identify patterns where optimizations may be performed to skip or eliminate the encoder computations and instead copy previously generated results of previously executed corresponding encoder computations, or replace the encoder computation with a predetermined value, e.g., zero. In some illustrative embodiments, the illustrative embodiments identify encoder computations in patterns of input data that would result in a zero result, a same result as a previous encoder computation, or conjugates of previous encoder computations (duplicate conjugates). In this way, the encoder computations corresponding to such instances may be eliminated and replaced with the predetermined value, or the previous result or conjugate, rather than having to repeatedly perform the encoder computations. This results in the speed of encoding of data for use with HE operations being increased. In fact, it has been determined that through the mechanisms of the illustrative embodiments, a 50-90% increase in speed of the encoding of data for HE operations may be achieved.

Figure 5:
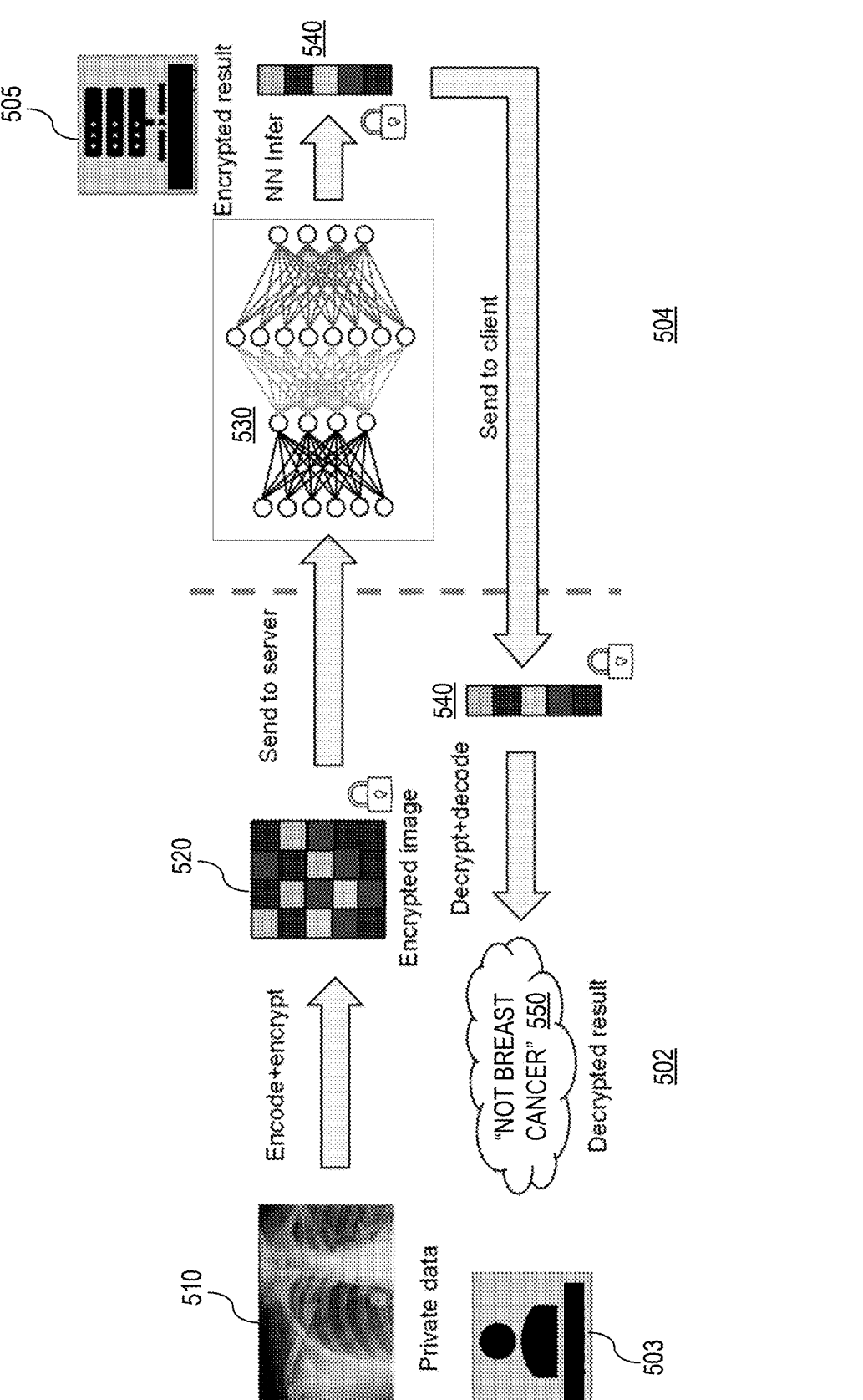
FIG. 5 is an example diagram of a homomorphic encryption (HE) operation in accordance with one illustrative embodiment.

FIG. 5 is an example diagram of a homomorphic encryption (HE) operation in accordance with one illustrative embodiment. As shown in FIG. 5, on a client side 502 of the HE operation, the client computing device 503 has private data 510, e.g., a medical image or the like, upon which the operator of the client, e.g., a client computing device, wants an HE operation to be performed, e.g., a classification of the medical image with regard to anomalies or the like. In order to preserve the privacy of the private data 510, the client computing device encodes and encrypts the private data 510 to generate an encrypted image 520. The encrypted image 520 is then transmitted via one or more data networks (not shown) to the server side 504 of the HE operation, implemented on one or more server computing devices 503.

At the server side 504, one or more artificial intelligence (AI) or machine learning computer models 530 are used to process the encrypted image 520 using HE computations to thereby infer an encrypted result 540, e.g., a classification of the encrypted image 520. This is done without decrypting the encrypted image 520, and thus the privacy of the original private data 510 is preserved. The encrypted result 540 is returned to client computing device 503 of the client side 502, which then decrypts and decodes the encrypted result 540 to obtain the plaintext result 550. For example, in this case, the medical image 510 may be evaluated to determine the presence of an anomaly or that the medical image does not have indications of the anomaly, e.g., breast cancer or the like.

The encoding and encryption operation on the private data 510 may be performed in various ways. Often such encoding and encryption operations involve Discrete Fourier Transform (DFT) operations or Inverse Discrete Fourier Transform (IDFT) operations, such as in the HE scheme referred to as CKKS, e.g., in CKKS the encoding of a vector X is computed by Y=NTT(scale_and_round (IDFT(X))) and the decoding uses the inverse functions on Z=DFT(INTT(Y)) (where NTT refers to a Number Theoretic Transform and INTT is the inverse NTT). In a DFT operation, for an input sequence $(x)_{0 \le i < N}$, the DFT operation computes an output sequence $(X)_{0 \le i < N}$ where $$X_k = \sum\nolimits_{n=0}^{N-1} x_n e^{-\frac{i2\pi kn}{N}}.$$

The inverse DFT (IDFT) converts $(X)_{0 \le i < N}$ to $(x)_{0 \le i < N}$ as $$X_k = \frac{1}{N} \sum\nolimits_{n=0}^{N-1} X_n e^{\frac{i2\pi kn}{N}},$$

where N is the input/output vector size, x is the input to the DFT in the time domain, X is the output of the DFT in the frequency domain, k is the k'th element in the vector x or X, and n is an index used by the summation. Many different algorithms exist to compute DFT and IDFT. For example, some algorithms for computing DFT and IDFT are based on the Cooley-Tukey Fast Fourier Transform (FFT) algorithm, the Gentleman-Sande FFT algorithm, and the like. These algorithms involve N log(N) steps, referred to as "butterflies", where a "butterfly" is a small DFT, e.g., a size-2 DFT, that combines even and odd transforms, which is so named due to the shape of a dataflow diagram for the radix-2 case.

It has been recognized that there are consistent properties of the DFT/FFT computations. For example, it has been recognized that when the input to a DFT/FFT computation has a certain property, the output of the DFT/FFT computation also has a certain corresponding property, e.g., when the input is periodic, the output is discrete and vice versa. Various optimizations may be performed on the DFT/FFT computations to take advantage of the recognized properties. For example, in the frequency domain, sparse fast Fourier transform (SFFT) may be used with sparse input vectors to reduce the computation from O(n log(n)) to O(n log(k)) where n is the signal length and k is a number of non-zero entries. In FFT for real-symmetric data, when the input is of a particular form, the output is a vector of real values. Moreover, in number-theoretic transform (NTT), an integer DFT is performed which generalizes the DFT to finite fields and which inherits many of the DFT properties, such as the input-output relation, and butterfly-based algorithms may operate on the DFT.

The illustrative embodiments, improve the encoding process at the client side 502 but, in some illustrative embodiments, utilizes server side 504 mechanisms to emit code that optimizes the encoding operation for execution on the client side 502 computing device, e.g., client 503. Thus, it will be recognized that while the illustrative embodiments will be described with an example distribution of functions and operations, as well as their corresponding computing elements, between the client and server sides of the HE operation, other illustrative embodiments may utilize a different distribution without departing from the spirit and scope of the present invention, e.g., some operations, functions, and computing elements described as being implemented on the server side may in other illustrative embodiments be implemented on the client side and vice versa.

The illustrative embodiments will be described with reference to an encoding for Cheon-Kim-Kim-Song (CKKS) homomorphic encryption as an example encoding operation which may be improved by the mechanisms of the illustrative embodiments. CKKS is a public key encryption scheme with secret and public keys which exploits the structure of integer polynomial rings for plaintext and ciphertext spaces. CKKS allows for direct multiplication and other linear arithmetic operations on ciphertexts. With CKKS encryption, an IDFT algorithm is first applied on an N-vector, a Residue Number System (RNS) algorithm is then applied on each coefficient according to a predefined set of integers (primes or composite), and then a Number Theoretic Transform (NTT) algorithm is applied on every resulting vector. CKKS is a known encryption scheme, however in accordance with one or more of the illustrative embodiments, the mechanisms of the present invention are able to speed up the CKKS encoding method due to the encoding improvements provided by the invention. It should be appreciated that the improvements of learning correlations between patterns and optimizations to the encoding computations that can be used to eliminate or replace computations which predetermined values or previously computed values may be likewise applied to other encryption algorithms, other than CKKS, without departing from the spirit and scope of the present invention.

Figure 6:
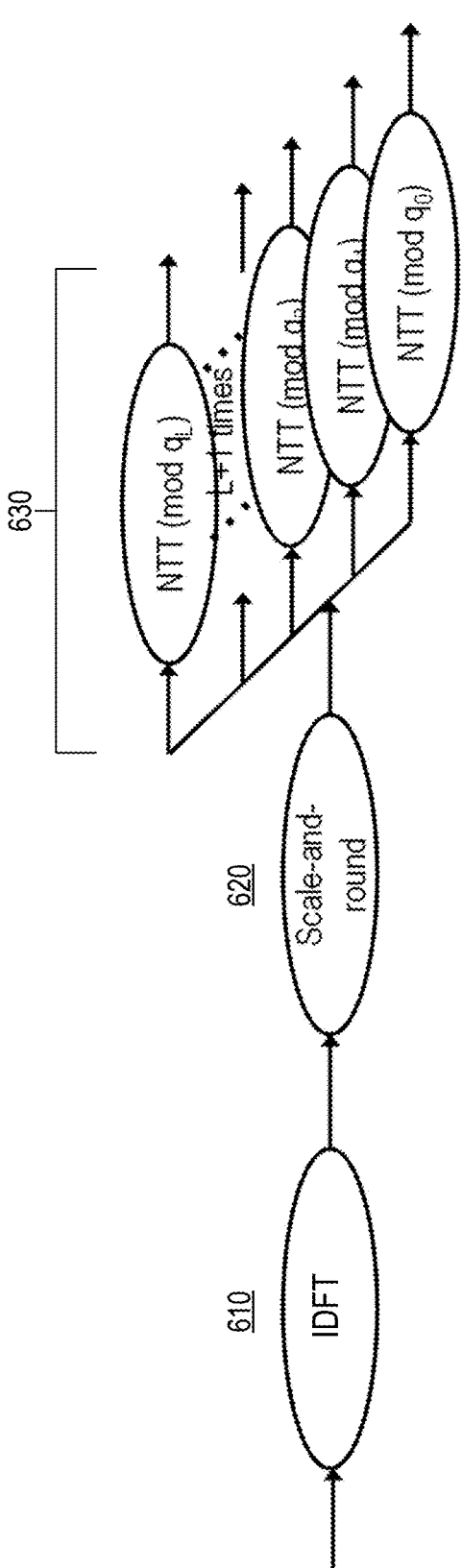
FIG. 6 is an example diagram illustrating a full-RNS CKKS encoding procedure in accordance with one illustrative embodiment.

Assuming an encoding operation for CKKS encryption as an example, where this encoding and encryption are implemented by a client side encoder of a client device, in order to encode a given cleartext into plaintext data, i.e., unencrypted ciphertexts that can be encrypted using CKKS, the following operation, which is also depicted graphically in FIG. 6, is performed. For a given input vector $(x)_{0 \le i < N/2}$ of data values (N/2 is the size of the input vector while N is the CKKS polynomial degree), the encoding operation applies an IDFT algorithm 610 on the vector of N complex numbers, first an IDFT algorithm is applied on the N-vector, $\hat{x} = (x)_{0 \le i < N/2} \| (x^*)_{0 \le i < N/2}$, where $\|$ denotes concatenation and x* is the conjugate of x, as follows:

$$X_k = iDFT(\hat{x}) \qquad (1)$$

An Residue Number System (RNS) algorithm is applied on each coefficient according to a predefined set of integers (primes or composite) Q (the coefficient modulus), as follows:

$$RNS(X_k) = \left(X_k^{q_i}\right)_{q_i \in Q} \qquad (2)$$

This may be done by scaling the complex number's real part with a scaling factor, rounding it to the nearest integer, and then decomposing into a set of numbers based on the selected components of Q using Chinese Remainder Theorem (CRT). This is referred to in FIG. 6 as "Scale-and-Round" 620. A NTT algorithm 630 is then applied on every vector $(X^{q_i})_{q_i \in Q}$. In the example of FIG. 6, the value of Q is $$\Pi_i^L q_i,$$

where L is the number of primes that compose Q. The DFT, or IDFT, operation and/or NNT operation can operate over different mathematical structures e.g., rings or fields, as defined by the underlying HE scheme (specifically by the encoding method of the HE scheme), e.g., CKKS or a conjugate invariant ring.

The illustrative embodiments provide an improved computing tool and improved computing tool operations/functionality to speed up the encoding procedure by identifying computations that may be skipped or eliminated. In particular, the illustrative embodiments comprise an offline portion and an online portion. The offline portion may be implemented, for example, by an encoding optimizer implemented by one or more server computing systems on a server side or on the client side of the HE operation. In some cases the server on the server side 504 in FIG. 5 may be used to pre-analyze the data, however the encoding, which is confidential, may be performed on a client side device, such as a client computing device, client side server, or the like. The online portion may take the optimized encoding algorithms generated by the offline portion, e.g., the server side encoding optimizer, and implement the optimized algorithms at the client, e.g., client 503, on the client side of the HE operation, e.g., 502 in FIG. 5.

An entity, referred to herein as an HE orchestrator, such as a client computing system, server side computing system, or other third party system, provides the necessary information for the HE protocol and parameters, which includes the choice of algorithms, data sizes, tensor packing, and determines the repeating patterns of the inputs, to the client-side and server-side portions of the HE system. For purposes of this description of the illustrative embodiments, the HE orchestrator will be considered to be the client side computing system, as a non-limiting example, but could alternatively be the server side computing system or a third party computing system that communicates with both the client and server side computing systems.

The offline portion implemented by the encoding optimizer receives, from the HE orchestrator, a set of IDFT/NTT algorithms and metadata that defines the structure of a given input, such as from the client on the client side (although again, this may otherwise be the server or a third party system). This may be performed prior to the client sending workloads to the server side for processing, e.g., such as when the client registers or logs onto a server side computing system for submission HE computation workloads. The client may submit the IDFT/NTT algorithms that the client plans to implement for the encoding along with metadata defining the structure of the inputs that will be encoded using these algorithms. Alternatively, as note above, because the encoding is confidential, the encoding may be performed on the client side by a client device or client side server, in which case the IDFT/NTT algorithms may be instantiated on the client side devices. In some cases, the encoding may also be performed in peer2peer communications where the server and client are similar in terms of compute capabilities.

The offline portion, e.g., encoding optimizer, evaluates the provided IDFT/NTT algorithms along with the metadata of the structure of the inputs that will be processed and generates optimized DFT or IDFT algorithm, Scale-and-Round algorithm, and/or NTT algorithm, or a mask that can be consumed by hardware implements (for purposes of illustration herein, it is assumed that optimized algorithms are the output), for those types of inputs, e.g., by using a specific pruning optimization of the illustrative embodiments for recognized patterns in the inputs and corresponding computation results, such as zero coefficients, previously computed coefficients, or conjugates of other coefficients. The pruning removes computations of coefficients that can be replaced with zeroes or a copying in of a previous coefficient or its conjugate. The pruning removes computations for specific portions of the inputs and modifies the DFT/Scale-and-Round (or RNS)/NTT algorithms to implement alternative copying operations to set the coefficients to the predetermined values rather than having to compute those coefficients. The resulting optimized (modified) algorithms (or mask) are then sent to the client side for execution as part of an online operation.

The online portion is implemented at the client side for encoding and encrypting private data as inputs, e.g., performing a CKKS encoding and encryption operation as described previously. The online portion, e.g., an encoder implemented on the client device, receives the optimized algorithms and implements the optimized algorithms as part of the client side encoder. The optimized algorithms look for input that has metadata corresponding to the metadata used to generate the optimized algorithms, i.e., matching the metadata defining the structure of the private data to the metadata specifying the structures for which the optimized algorithms have been optimized. If there is not a match, then the original, non-optimized, encoder algorithms may be implemented to perform the encoding of the private data. Assuming a match of these metadata, then the optimized algorithms operate to skip the computations where zeroes or a copying in of a previous coefficient or its conjugate may be performed. As a result, fewer computations are required, the speed of the encoding operation is increased, and the power consumption of the computation is reduced, which leads to a more sustainable and cost effective solution.

Before continuing the discussion of the various aspects of the illustrative embodiments and the improved computer operations performed by the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on hardware to thereby configure the hardware to implement the specialized functionality of the present invention which the hardware would not otherwise be able to perform, software instructions stored on a medium such that the instructions are readily executable by hardware to thereby specifically configure the hardware to perform the recited functionality and specific computer operations described herein, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular technological implementation for accomplishing and/or performing the actions, steps, processes, etc., attributable to and/or performed by the engine, but is limited in that the "engine" is implemented in computer technology and its actions, steps, processes, etc. are not performed as mental processes or performed through manual effort, even if the engine may work in conjunction with manual input or may provide output intended for manual or mental consumption. The engine is implemented as one or more of software executing on hardware, dedicated hardware, and/or firmware, or any combination thereof, that is specifically configured to perform the specified functions. The hardware may include, but is not limited to, use of a processor in combination with appropriate software loaded or stored in a machine readable memory and executed by the processor to thereby specifically configure the processor for a specialized purpose that comprises one or more of the functions of one or more embodiments of the present invention. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

It should be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

The present invention may be a specifically configured computing system, configured with hardware and/or software that is itself specifically configured to implement the particular mechanisms and functionality described herein, a method implemented by the specifically configured computing system, and/or a computer program product comprising software logic that is loaded into a computing system to specifically configure the computing system to implement the mechanisms and functionality described herein. Whether recited as a system, method, of computer program product, it should be appreciated that the illustrative embodiments described herein are specifically directed to an improved computing tool and the methodology implemented by this improved computing tool. In particular, the improved computing tool of the illustrative embodiments specifically provides an encoding optimizer for offline optimization of encoding algorithms for specific input structures, and an online implementation of the optimized encoding algorithms on online input data structures. The improved computing tool implements mechanism and functionality, such as the encoding optimizer and an encoder, which cannot be practically performed by human beings either outside of, or with the assistance of, a technical environment, such as a mental process or the like. The improved computing tool provides a practical application of the methodology at least in that the improved computing tool is able to optimize encoding algorithms for implementation by an encoder for encoding data that is the target of homomorphic encryption (HE) operations.

Figure 7:
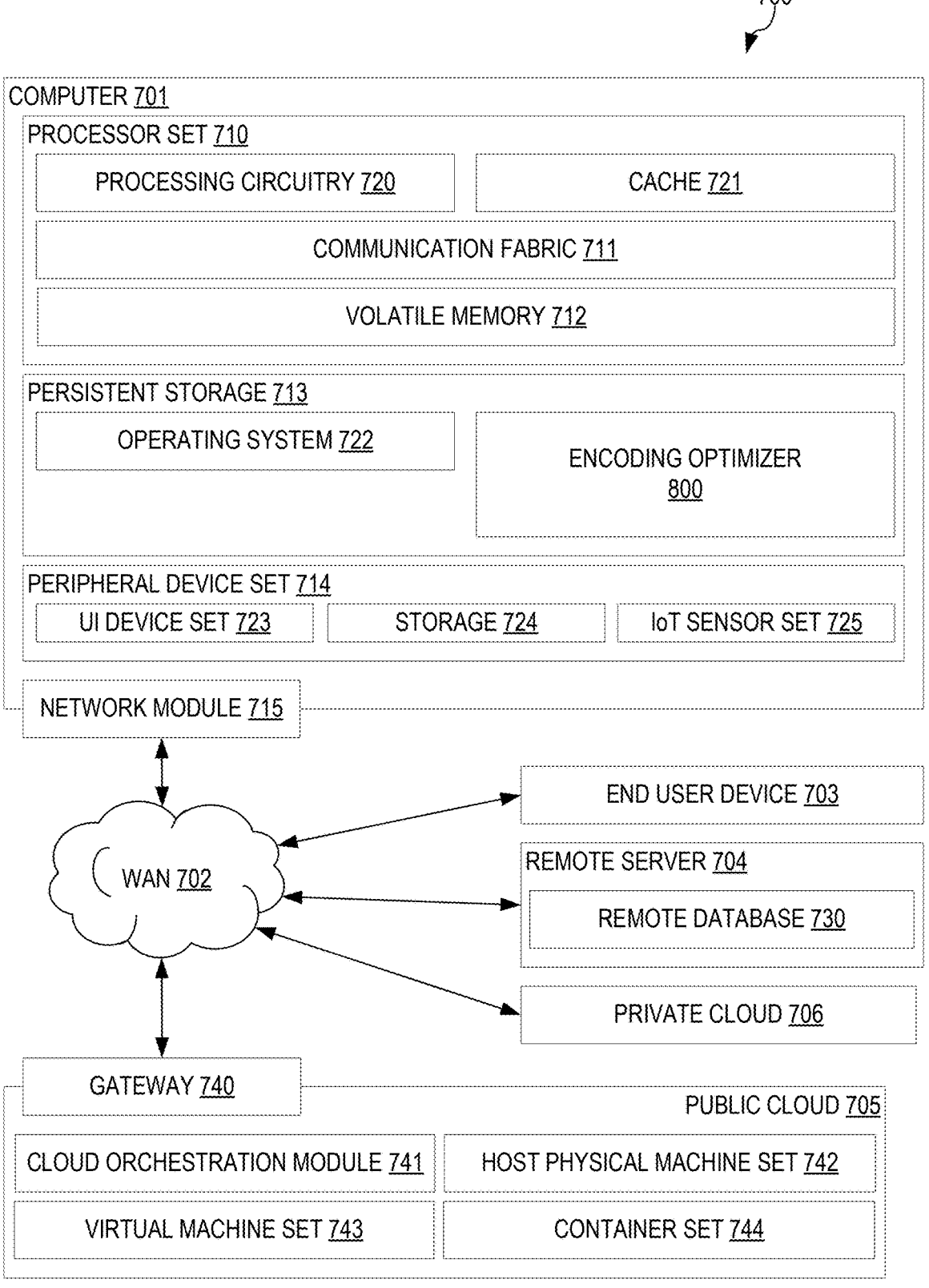
FIG. 7 is an example diagram of a distributed data processing system environment in which aspects of the illustrative embodiments may be implemented and at least some of the computer code involved in performing the inventive methods may be executed.

FIG. 7 is an example diagram of a distributed data processing system environment in which aspects of the illustrative embodiments may be implemented and at least some of the computer code involved in performing the inventive methods may be executed. That is, computing environment 700 contains an example of an environment for the execution of at least some of the computer code involved in performing the inventive methods, such as encoding optimizer 800. In addition to encoding optimizer 800, computing environment 700 includes, for example, computer 701, wide area network (WAN) 702, end user device (EUD) 703, remote server 704, public cloud 705, and private cloud 706. In this embodiment, computer 701 includes processor set 710 (including processing circuitry 720 and cache 721), communication fabric 711, volatile memory 712, persistent storage 713 (including operating system 722 and encoding optimizer 800, as identified above), peripheral device set 714 (including user interface (UI), device set 723, storage 724, and Internet of Things (IoT) sensor set 725), and network module 715. Remote server 704 includes remote database 730. Public cloud 705 includes gateway 740, cloud orchestration module 741, host physical machine set 742, virtual machine set 743, and container set 744.

Computer 701 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 730. As is well understood in the art of computer technology, and depending upon the technology, performance of a computer-implemented method may be distributed among multiple computers and/or between multiple locations. On the other hand, in this presentation of computing environment 700, detailed discussion is focused on a single computer, specifically computer 701, to keep the presentation as simple as possible. Computer 701 may be located in a cloud, even though it is not shown in a cloud in FIG. 7. On the other hand, computer 701 is not required to be in a cloud except to any extent as may be affirmatively indicated.

Processor set 710 includes one, or more, computer processors of any type now known or to be developed in the future. Processing circuitry 720 may be distributed over multiple packages, for example, multiple, coordinated integrated circuit chips. Processing circuitry 720 may implement multiple processor threads and/or multiple processor cores. Cache 721 is memory that is located in the processor chip package(s) and is typically used for data or code that should be available for rapid access by the threads or cores running on processor set 710. Cache memories are typically organized into multiple levels depending upon relative proximity to the processing circuitry. Alternatively, some, or all, of the cache for the processor set may be located "off chip." In some computing environments, processor set 710 may be designed for working with qubits and performing quantum computing.

Computer readable program instructions are typically loaded onto computer 701 to cause a series of operational steps to be performed by processor set 710 of computer 701 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 721 and the other storage media discussed below. The program instructions, and associated data, are accessed by processor set 710 to control and direct performance of the inventive methods. In computing environment 700, at least some of the instructions for performing the inventive methods may be stored in encoding optimizer 800 in persistent storage 713.

Communication fabric 711 is the signal conduction paths that allow the various components of computer 701 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 712 is any type of volatile memory now known or to be developed in the future. Examples include dynamic type random access memory (RAM) or static type RAM. Typically, the volatile memory is characterized by random access, but this is not required unless affirmatively indicated. In computer 701, the volatile memory 712 is located in a single package and is internal to computer 701, but, alternatively or additionally, the volatile memory may be distributed over multiple packages and/or located externally with respect to computer 701.

Persistent storage 713 is any form of non-volatile storage for computers that is now known or to be developed in the future. The non-volatility of this storage means that the stored data is maintained regardless of whether power is being supplied to computer 701 and/or directly to persistent storage 713. Persistent storage 713 may be a read only memory (ROM), but typically at least a portion of the persistent storage allows writing of data, deletion of data and re-writing of data. Some familiar forms of persistent storage include magnetic disks and solid state storage devices. Operating system 722 may take several forms, such as various known proprietary operating systems or open source Portable Operating System Interface type operating systems that employ a kernel. The code included in encoding optimizer 800 typically includes at least some of the computer code involved in performing the inventive methods.

Peripheral device set 714 includes the set of peripheral devices of computer 701. Data communication connections between the peripheral devices and the other components of computer 701 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 723 may include components such as a display screen, speaker, microphone, wearable devices (such as goggles and smart watches), keyboard, mouse, printer, touchpad, game controllers, and haptic devices. Storage 724 is external storage, such as an external hard drive, or insertable storage, such as an SD card. Storage 724 may be persistent and/or volatile. In some embodiments, storage 724 may take the form of a quantum computing storage device for storing data in the form of qubits. In embodiments where computer 701 is required to have a large amount of storage (for example, where computer 701 locally stores and manages a large database) then this storage may be provided by peripheral storage devices designed for storing very large amounts of data, such as a storage area network (SAN) that is shared by multiple, geographically distributed computers. IoT sensor set 725 is made up of sensors that can be used in Internet of Things applications. For example, one sensor may be a thermometer and another sensor may be a motion detector.

Network module 715 is the collection of computer software, hardware, and firmware that allows computer 701 to communicate with other computers through WAN 702. Network module 715 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 715 are performed on the same physical hardware device. In other embodiments (for example, embodiments that utilize software-defined networking (SDN)), the control functions and the forwarding functions of network module 715 are performed on physically separate devices, such that the control functions manage several different network hardware devices. Computer readable program instructions for performing the inventive methods can typically be downloaded to computer 701 from an external computer or external storage device through a network adapter card or network interface included in network module 715.

WAN 702 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 703 is any computer system that is used and controlled by an end user (for example, a customer of an enterprise that operates computer 701), and may take any of the forms discussed above in connection with computer 701. EUD 703 typically receives helpful and useful data from the operations of computer 701. For example, in a hypothetical case where computer 701 is designed to provide a recommendation to an end user, this recommendation would typically be communicated from network module 715 of computer 701 through WAN 702 to EUD 703. In this way, EUD 703 can display, or otherwise present, the recommendation to an end user. In some embodiments, EUD 703 may be a client device, such as thin client, heavy client, mainframe computer, desktop computer and so on.

Remote server 704 is any computer system that serves at least some data and/or functionality to computer 701. Remote server 704 may be controlled and used by the same entity that operates computer 701. Remote server 704 represents the machine(s) that collect and store helpful and useful data for use by other computers, such as computer 701. For example, in a hypothetical case where computer 701 is designed and programmed to provide a recommendation based on historical data, then this historical data may be provided to computer 701 from remote database 730 of remote server 704.

Public cloud 705 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 705 is performed by the computer hardware and/or software of cloud orchestration module 741. The computing resources provided by public cloud 705 are typically implemented by virtual computing environments that run on various computers making up the computers of host physical machine set 742, which is the universe of physical computers in and/or available to public cloud 705. The virtual computing environments (VCEs) typically take the form of virtual machines from virtual machine set 743 and/or containers from container set 744. It is understood that these VCEs may be stored as images and may be transferred among and between the various physical machine hosts, either as images or after instantiation of the VCE. Cloud orchestration module 741 manages the transfer and storage of images, deploys new instantiations of VCEs and manages active instantiations of VCE deployments. Gateway 740 is the collection of computer software, hardware, and firmware that allows public cloud 705 to communicate through WAN 702.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 706 is similar to public cloud 705, except that the computing resources are only available for use by a single enterprise. While private cloud 706 is depicted as being in communication with WAN 702, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 705 and private cloud 706 are both part of a larger hybrid cloud.

As shown in FIG. 7, one or more of the computing devices, e.g., computer 701 or remote server 704, may be specifically configured to implement an encoding optimizer 800. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as computer 701 or remote server 704, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates optimization of encoding algorithms so as to reduce computations of coefficients and thereby speed up the encoding process for homomorphic encryption (HE) or Fully Homomorphic Encryption (FHE).

Figure 8:
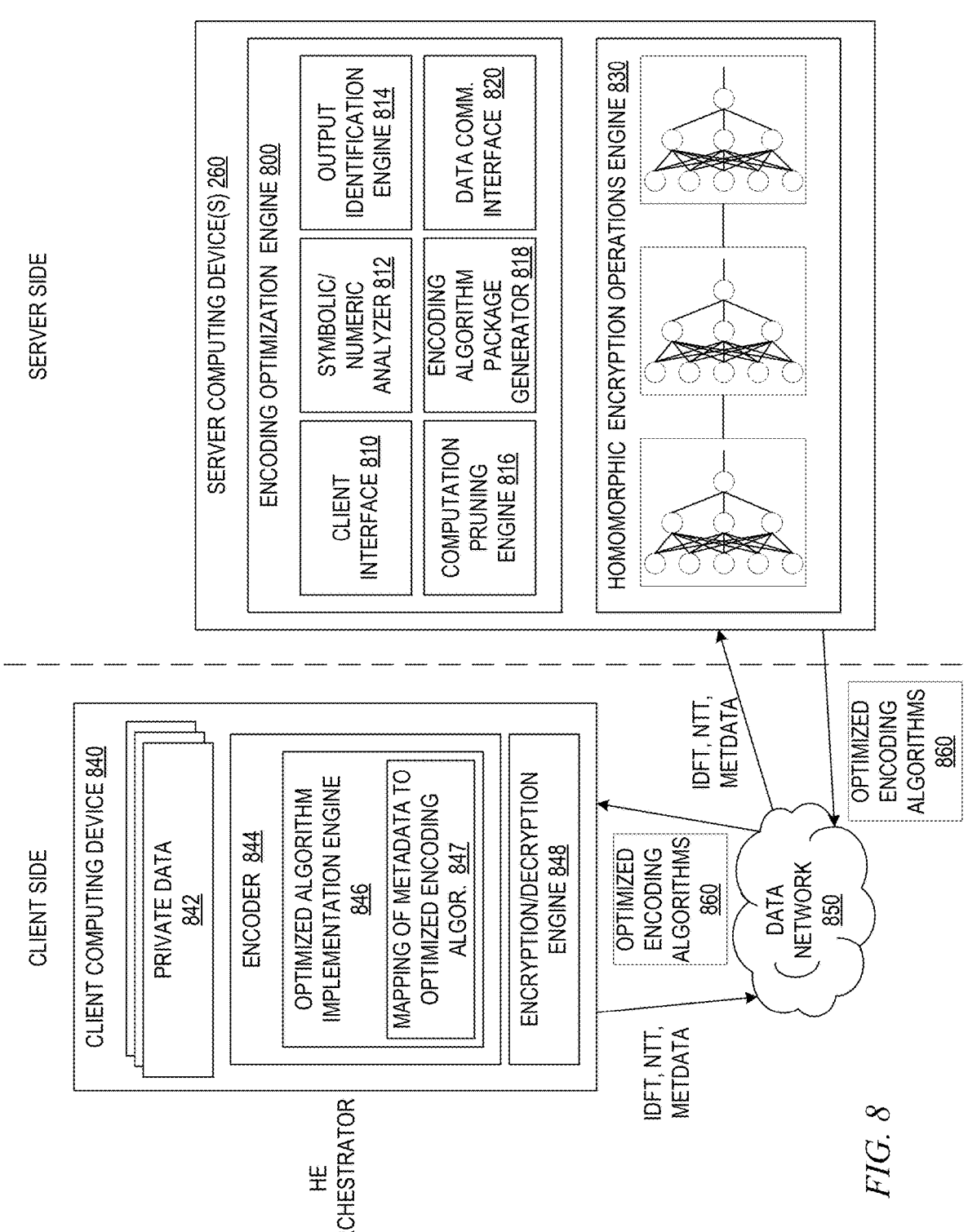
FIG. 8 is an example block diagram of an encoding optimizer in accordance with one illustrative embodiment.

FIG. 8 is an example block diagram illustrating the primary operational components of an encoding optimizer in accordance with one illustrative embodiment. The operational components shown in FIG. 8 may be implemented as dedicated computer hardware components, computer software executing on computer hardware which is then configured to perform the specific computer operations attributed to that component, or any combination of dedicated computer hardware and computer software configured computer hardware. It should be appreciated that these operational components perform the attributed operations automatically, without human intervention, even though inputs may be provided by human beings, e.g., search queries, and the resulting output may aid human beings. The invention is specifically directed to the automatically operating computer components directed to improving the way that encodings are performed on data to facilitate homomorphic encryption or fully homomorphic encryption operations, where this data may be private or non-private data. Such encoding algorithm optimizations and corresponding encoding operations cannot be practically performed by human beings as a mental process and is not directed to organizing any human activity.

As shown in FIG. 8, the encoding optimizer 800 includes a client interface 810, symbolic/numeric analyzer 812, output identification engine 814, computation pruning engine 816, encoding algorithm package generator 818, and data communication interface 820. The encoding optimizer 800 may receive, from a client computing device via the client interface 810, input from the client computing device 840 specifying the particular encoding algorithm implementations to be used by the encoder 844 and/or encryption decryption engine 848, e.g., the IDFT implementation and NTT implementation (see again FIG. 6). Again, this example illustrates the client computing device 840 operating as the HE orchestrator, however in other illustrative embodiments, the HE orchestrator may be implemented at the server computing devices 260 or at a third party computing system (not shown).

For example, the IDFT/NTT can be provided in the form of a software code in some programing language python/C/C++/Rust, etc. The module is able to analyze the code and suggest how to optimize it. The output in this case will be a modified code that prunes/removes/replaces redundant computations.

In some illustrative embodiments, the IDFT/NTT can be provided in the form of an algorithm that is implemented, again in software. The encoding optimizer 800 evaluates the algorithm and outputs an alternative optimized algorithm. The optimized algorithm can be in pseudo-code or as a mask that is applied to the algorithms at runtime. In some illustrative embodiments, the IDFT/NTT can be provided in the form of a hardware design where the encoding optimizer 800 analyzes the hardware design and recommends places to be pruned/bypassed. In still other illustrative embodiments, since the IDFT/NTT may be commonly used algorithms, the encoding optimizer 800 may already hold different possible implementations of the IDFT/NTT (e.g., Cooley-Tukey or Gentleman-Sande) and have pre-defined mechanisms to optimize these implementations for the particular case. In this situation, the client can provide the encoding optimizer 800, the name of the algorithm and the encoding optimizer 800 can provide a software code in a predefined language or a mask to hardware implementations. Thus, the illustrative embodiments can execute the input implementations, analyze their data flow using symbolic execution, and thereby determine how to optimize the algorithm or mask. Alternatively, the illustrative embodiments can utilize previously constructed algorithms and corresponding optimized implementations.

In addition, the input from the client computing device 840 includes metadata that describes the structure of the data within a vector, e.g., tile tensor shape, that will be used to provide the values for the private data 842 that will be encrypted. For example, using symbolic execution, the input implementation information is used to run the implementation with inputs that are symbols and observe the intermediate outputs. For example, assume an input vector of 6 elements (x1,x2,x3,x4,x5,x6), and a 2 elements vector output (x1+x2*x3, x4+x5*x6). If it is known that x1=x4 and x2=x5 and x3=x6 then it is also known that symbolically x1+x2*x3=x4+x5*x6, i.e., that one need only compute 1 of the two elements. If one symbolically computes all intermediate nodes, and then uses a hash to identify repeating places, then it can be determined how to optimize the specific implementation with regard to these repeated places.

These inputs, in some illustrative embodiments, represent CKKS encoder metadata in which the IDFT and NTT implementations can represent hardware, software, or a combination of hardware and software configurations for performing IDFT and NTT operations. The metadata for the structure of the input data may describe the data within a vector, for example. This can be tile tensor metadata or any other vector representation. For example, consider the vector x=[1,2,3,4] duplicated 4 times for generating a matrix. The duplication can be done over the first (rows) dimension (Matrix A below) using a tile tensor shape of [4/4, */4], over the second (columns) dimension (matrix B below) using a tile tensor shape of [*/4, 4/4], or over e.g., the matrix diagonals (matrix C below) using a tile tensor shape of [4(d)/4, */4]:

$$A = \begin{pmatrix} 1 & 2 & 3 & 4 \\ 1 & 2 & 3 & 4 \\ 1 & 2 & 3 & 4 \\ 1 & 2 & 3 & 4 \end{pmatrix} \text{ or } B = \begin{pmatrix} 1 & 1 & 1 & 1 \\ 2 & 2 & 2 & 1 \\ 3 & 3 & 3 & 3 \\ 4 & 4 & 4 & 4 \end{pmatrix} \text{ or } C = \begin{pmatrix} 1 & 2 & 3 & 4 \\ 4 & 1 & 2 & 3 \\ 3 & 4 & 1 & 2 \\ 2 & 3 & 4 & 1 \end{pmatrix}$$

When packed in plaintext the results are [1,2,3,4,1,2,3,4,1, 2,3,4,1,2,3,4], [1,1,1,1,2,2,2,2,3,3,3,3,4,4,4,4], and [1,2,3,4, 4,1,2,3,3,4, 1,2,2,3,4,1], respectively. As can be seen from the plaintext, there are periodic inputs or patterns in these inputs, e.g., patterns of "ABCDABCDABCDABCD", "AAAABBBBCCCCDDDD", and "ABCDDABCCD-ABBCDA".

Using the IDFT property that periodic inputs lead to discrete outputs, it is known that parts of the output coefficients will be 0 and parts of the coefficients will be the conjugates of other coefficients. In fact, it is known that some "butterflies", or computations, can be saved due to duplicate coefficient values. The concept of "butterflies" refers to the relationships between parallel computations in parallel vector or matrix computations, such as in the case of tile tensors for HE computations, for example. These butterflies are present in the IDFT and NTT operations of the CKKS encoding and encryption shown in FIG. 6, for example.

Figure 9A:
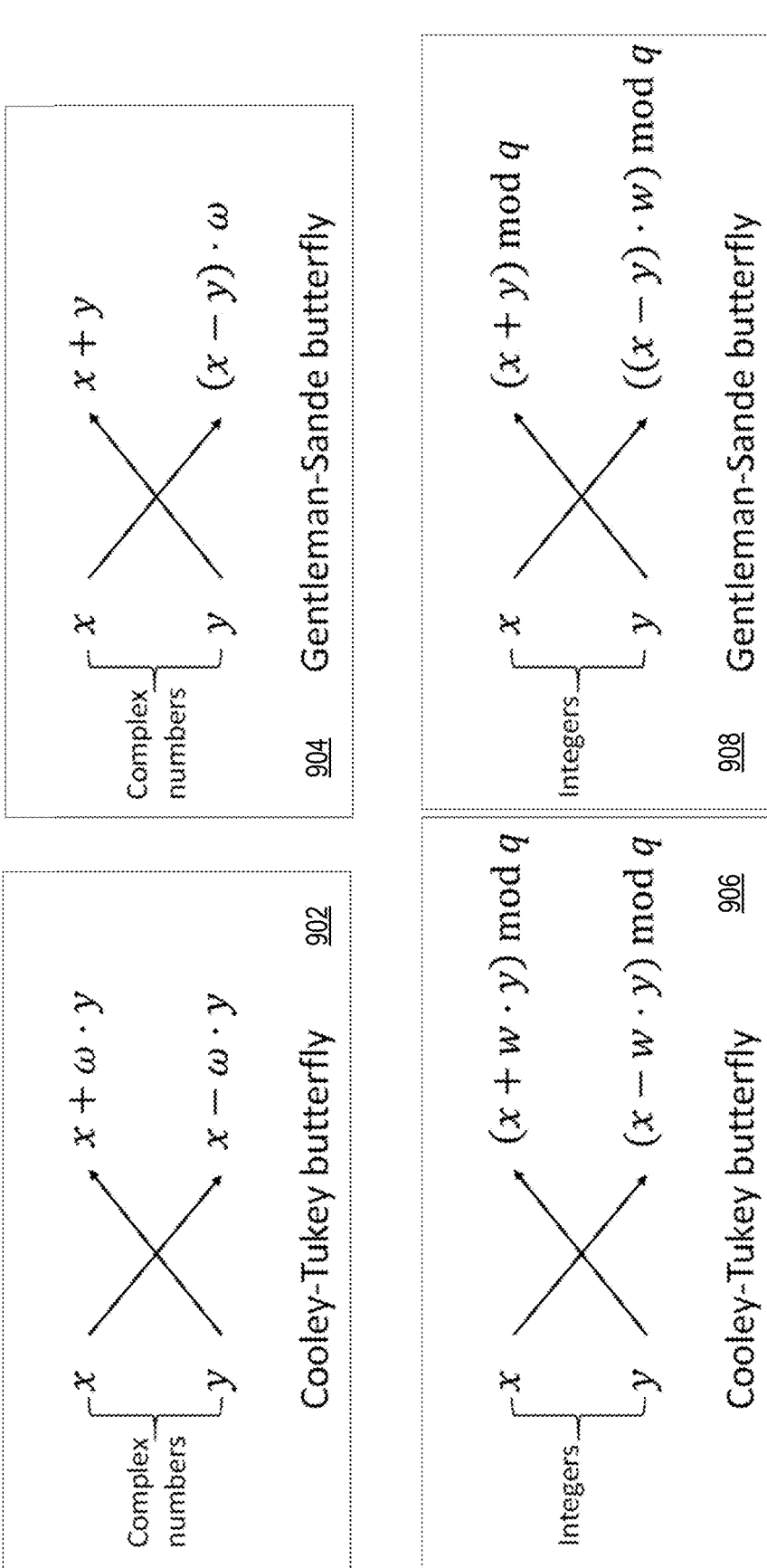
FIG. 9A is an illustration of examples butterfly operations for both Inversed Discrete Fourier Transform (IDFT) and Number Theoretic Transform (NTT) operations using the Cooley-Tukey and Gentleman-Sande algorithms.

FIG. 9A is an illustration of examples butterfly operations for both IDFT 902-904 and NTT 906-908 operations using the Cooley-Tukey and Gentleman-Sande algorithms. It is assumed in the illustrative embodiments that the IDFT is performed using a fast Fourier Transform (FFT) like algorithm, such as those of FIG. 9A, whereby the IDFT of a list of N complex numbers is computed in $\log_2$ N stages of a butterfly network, and where each stage is composed of butterfly operations such as those shown in FIG. 9A.

Figure 9B:
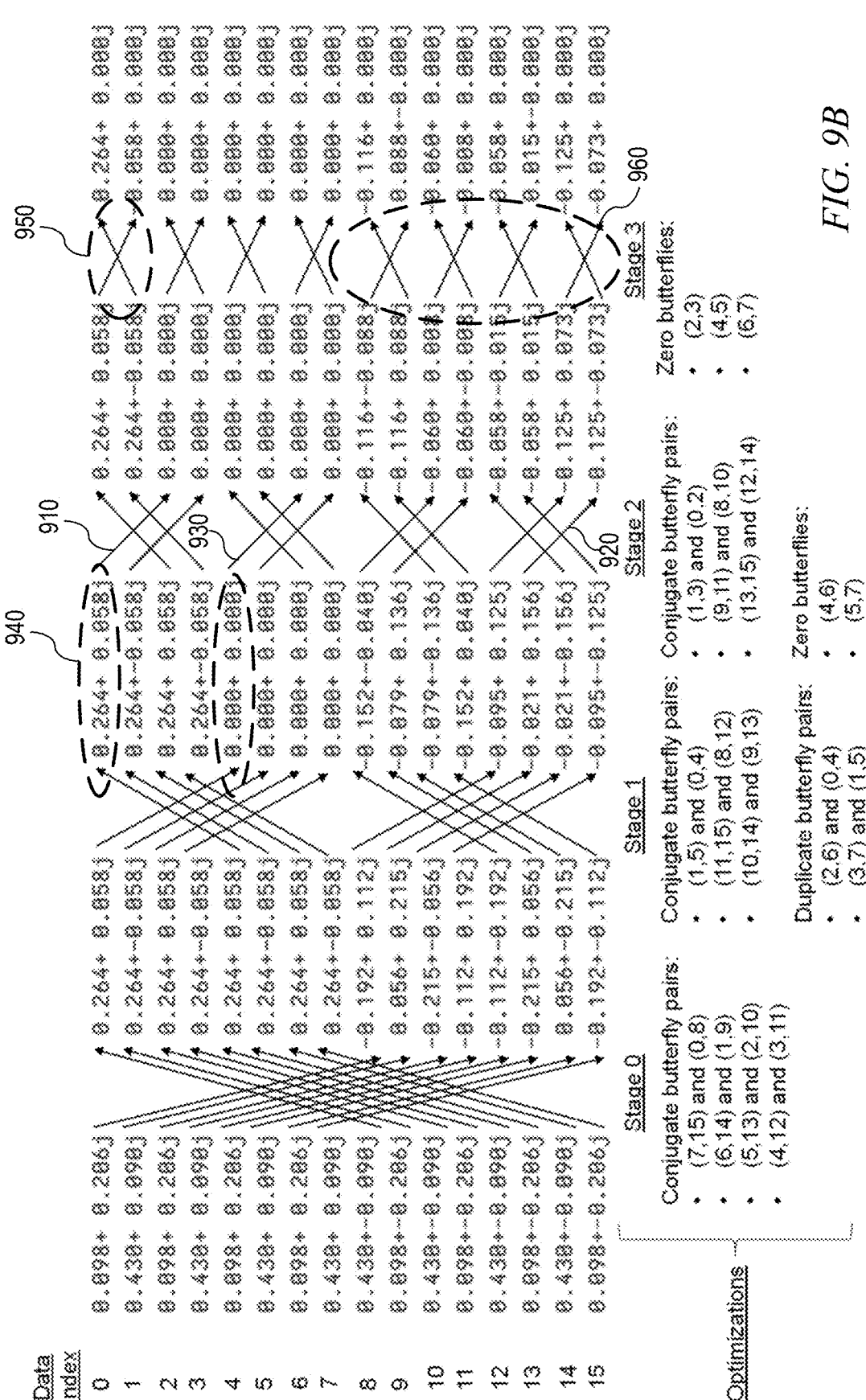
FIG. 9B illustrates an example of butterfly computations for an IDFT operation in accordance with one illustrative embodiment.

FIG. 9B illustrates an example of butterfly computations for an IDFT operation, such as 610 in FIG. 6, in accordance with one illustrative embodiment. Each column of butterflies in FIG. 9B represents a stage of the IDFT operation (i.e., one of the N log(N) stages of an N-point IDFT) and the arrows represent data flows for performing computations corresponding to the first step of CKKS encoding. In accordance with the illustrative embodiments, the depiction shown in FIG. 9B, arrows 910 show butterflies that may be copied as they are previously computed, arrows 920 show butterfly copies and conjugates of a other butterflies; and arrows 930 indicate computations that may be skipped due to the coefficients being zero. As can be seen from the representation in FIG. 9B, the crossed arrows represent related computations, with the crossing representing a butterfly pattern and thus, are referred to as "butterflies" or "butterfly computations". In some cases, for some butterflies, a computation savings is not possible due to the particular computations not having zero coefficients or previously computed values, or conjugates of previously computed values, e.g., computations 940, 950, and 960.

FIG. 10 illustrates an example scale-and-round operation, such as scale-and-round operation 620 in FIG. 6, or RNS operation, in accordance with one illustrative embodiment. In the depiction of FIG. 10, the arrows 1010 imply computations that may be skipped since the results are 0. The other arrows 1020 represent regular scale-and-round computations, i.e., no optimization by the mechanisms of the illustrative embodiments.

Figure 11:
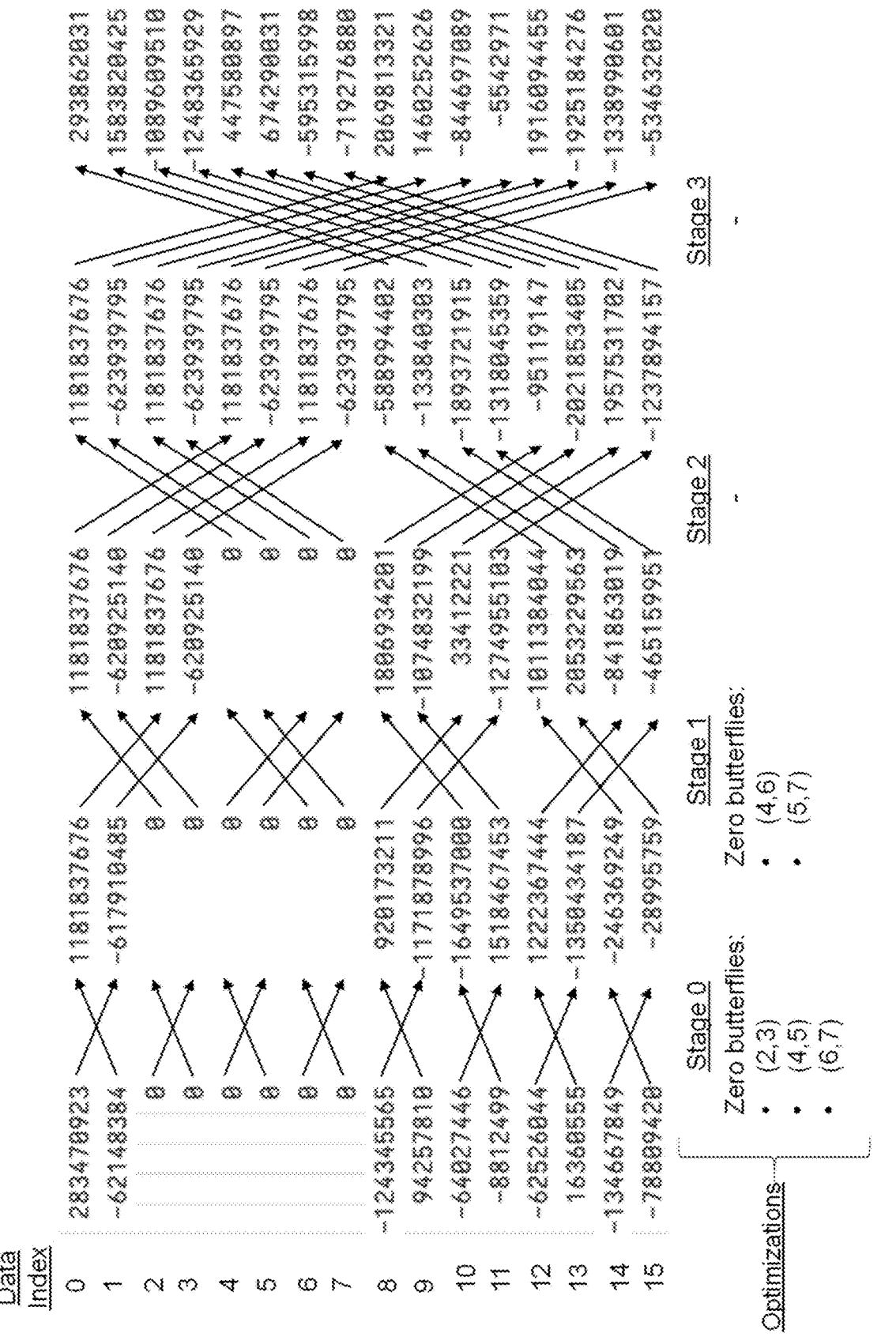
FIG. 11 illustrates an example of butterfly computations for a Number Theoretic Transform (NTT) operation in accordance with one illustrative embodiment.

FIG. 11 illustrates an example of butterfly computations for an NTT operation, such as NTT operations 630 in FIG. 6, in accordance with one illustrative embodiment. In the depiction of FIG. 11, similar to that of FIG. 9B, arrows 1110 represent copied butterflies. Arrows 1120 represent butterfly copies and conjugates of other butterflies. Arrows 1130 imply computations that may be skipped since the results are zero.

With these observations of butterflies and computations that may be saved due to duplicate values, zeroes, or conjugates of previously computed values, with reference again to FIG. 8, the information received from the HE orchestrator, e.g., client computing device 840 in this example, may be analyzed to identify periodic patterns in the input from the client computing device 840 which can be mapped to zeroes, duplicate values, or conjugate values of previously computed values to thereby identify computations that may be skipped or eliminated from the optimized encoding algorithms for the particular input.

In accordance with one illustrative embodiment, the input received via the client interface 810 from the client computing device 840 is processed by the computer executed logic of the symbolic/numeric analyzer 812 to represent the input to the given IDFT algorithm. For example, the symbolic/numeric analyzer 812 marks the intermediate point of the algorithm that ends with a same symbolic values, i.e., that these are always zero, equal, or conjugates, such that all the input operations to this intermediate point can be pruned. The symbolic/numeric analyzer 812 considers the variables rather than the numeric values and is a way of analyzing a program to determine what inputs cause each part of the program to execute. For example, consider the function f(integer a): b=a+5; if (b>8) print b. Normally, to execute the program, one would try some numerical input, e.g., a=5 and then follow the code b=5*5=10, b>8 so the program prints 10. However, from this one only learns what happens when a=5. To check what happens when a is in the range from [0,100] on would have to repeat the above test 100 times.

An alternative illustrative embodiment may consider empirical analysis using random values in lieu of symbolic execution. In symbolic execution, however, the symbol is instead considered and thus, would start with the variable a in the first line being in the range [0,100] and then, on the second line would learn that b is in the range from [5,105], and that on 96 cases when b is in the range [9,105] the program prints b. Thus, one can go backwards and learn which values of the variable a yield b in the range [9,105] i.e., the variable a being in the range of [4,100].

In the illustrative embodiments, the symbolic/numeric analyzer 812 performs a similar operation by following the execution of the algorithm or the implementation and analyzing the symbols received. Here, the symbolic/numeric analyzer 812 can ask different queries at different intermediate points of the execution to determine if the program always holds equal, zero, or conjugate data independent of the specific value that will be provided later on (i.e., for all inputs that satisfy a given pattern).

The output identification engine 814 comprises computer executed logic that identifies intermediate outputs and outputs that are zeros, duplicates of prior computations, or conjugates of prior computations. For example, consider the execution graph:

$$a \text{---}> b \text{---}> c$$
$$|\text{---}> d \text{---}> e$$
$$|\text{---}> f \text{---}> t$$

In this example, for an input a there are 3 outputs c, e, and t. Each one of the letters is an intermediate node in the graph. If, for example, the symbolic/numeric analyzer 812 identifies the same symbolic expression in b and d, then clearly there is no point to computing both c and e because the same result will be obtained regardless. Instead one can prune the graph to compute:

$$a \text{---}> b \text{---}> c$$
$$|\text{---}> f \text{---}> t$$

and claim that e=c.

In some cases the graph is more complicated and one cannot assume something on the final output, however the graph can still prune some intermediate nodes. For example, if the above example graph were changed to have another calculation v=e+t, the output of the graph now is (c, v, t) instead of (c, e, t). While e is not the final output, one can still prune it and replace v=e+t with v=c+t. This is just one example of one way in which an algorithm may be modified by the illustrative embodiments based on the input structure information. The output identification engine comprises logic and rules for evaluating the algorithm to identify such outputs and intermediate outputs for use in pruning computations corresponding to outputs that are zeros, duplicates, or conjugates.

The computation pruning engine 816, based on the identification of the outputs by the output identification engine 814, comprises computer executed logic that operates to replace (prune/skip) computations corresponding to the identified outputs and replace them with a simpler operation, e.g., a copy or copy-conjugate operation, from the associated place where these values were previously computed. For zeros, the computation pruning engine 816 prunes the computation and assigns a zero value. The result of the computation pruning engine 816 is an optimized algorithm in which these computations leading to the identified outputs are pruned/skipped and thus, the amount of computations needed to perform the encoding is reduced. This leads to a faster encoding. It should be appreciated that the operations of the output identification engine 814 and computation pruning engine 816 may be performed with regard to both the IDFT operations 610 in FIG. 6 and the NTT operations 630 in FIG. 6 so as to optimize both portions of the encoding. When performing these optimizations for the NTT implementation, the optimization is performed $|P|$ times per every vector $(X^{q_i})_{q_i \in Q}$.

The encoding algorithm package generator 818 packages the optimized algorithms, e.g., the optimized IDFT operations and optimized NTT operations, along with the symbolic RNS computation according to the predefined set of primes, i.e., the scale-and-round operation 620 in FIG. 6, so as to provide the optimized encoding algorithms 860. The optimized encoding algorithms 860 comprise the modified IDFT/NTT(s) implementations generated by the operation of the output identification engine 814 and computation pruning engine 816. The optimized encoding algorithms 860 may be generated by the generator 818 as new generated code, an unrolled implementation of the original implementation, a newly generated hardware design or a mask to a software/hardware implementation that supports masking the IDFT/NTT implementations. For purposes of the present description, it is assumed that the output is a newly generated code that is deployed to the encoder 844 of the client computing device 840 via the one or more data networks 850 and data communication interface 820.

The client computing device 840 receives the optimized encoding algorithms 860 for implementation with the encoder 844 via the optimized algorithm implementation engine 846. It should be appreciated that the optimization performed by the encoding optimization engine 800 may be performed with various types of inputs such that there may be different optimized encoding algorithms 860 for different input metadata, e.g., different types of private data 842. The optimized encoding algorithms 860 for a particular input metadata may be stored in association with that input metadata, such as in a mapping data structure 847 for later matching and retrieval of the optimized encoding algorithms 860 to be used to perform the encoding by the encoder 844.

The encoder 844 compares metadata of an input workload, e.g., private data 842, to the metadata associated with the optimized encoding algorithms 860 in the mapping data structure 847 for a match, if any. If there is a match, then the corresponding optimized encoding algorithms 860 are retrieved and executed to encode the private data 842, which may then be encrypted for homomorphic encryption operations by the homomorphic encryption operations engine 830. It should be noted that in some cases, after encoding the private data 842, encryption is not required and in some cases the encoded but unencrypted data may be kept for performance of other operations. However, for purposes of illustration herein, it is assumed that the encoded private data 842 is encrypted for use with homomorphic encryption operations. It should be appreciated that there exist cases where it is only needed to encode, and not encrypt, on the server side, e.g., if a neural network inference with a model containing non-confidential weight values is utilized, then the weights may be encoded on the server side for improved performance.

Thus, the encoder 844 receives standard plaintext input of the private data 842 and output auxiliary information, e.g., the mapping of metadata to optimized encoding algorithms, generated by the offline phase. The encoder 844 identifies the structure of the input data (metadata), e.g., the metadata of the private data 842. Note that this data is assumed to be not a secret otherwise its structure might leak. The optimized algorithm implementation engine 846 checks the mapping data structure 847 to determine if the encoder 844 received an optimized implementation for the analyzed structure of this type of input data from the offline operation of the encoding optimization engine 800. If not, the encoder 844 applies the standard encoding algorithms, e.g., the non-optimized encoding algorithms. Otherwise, if there is a matching optimized encoding algorithm based on the mapping data structure 847, the encoder 844 replaces/applies masks to the IDFT/RNS/NTT implementations based on the offline system results, i.e., the optimized encoding algorithms. Thus, an optimized encoding operation is performed that is performed faster and requires less computation resources. The encoded data is then provided to the encryption/decryption engine 848 which encrypts the encoded data and provides the encrypted data, i.e., ciphertexts, to the homomorphic encryption operations engine 830, which may comprise one or more HE computation neural networks or other HE computation logic to perform HE operations on encrypted data and provide an encrypted output that is returned to the client computing device 840 which decrypts the encrypted output to obtain the plaintext for further use.

FIGS. 12-17 present flowcharts outlining example operations of elements of the present invention with regard to one or more illustrative embodiments. It should be appreciated that the operations outlined in FIGS. 12-17 are specifically performed automatically by an improved computer tool of the illustrative embodiments and are not intended to be, and cannot practically be, performed by human beings either as mental processes or by organizing human activity. To the contrary, while human beings may, in some cases, initiate the performance of the operations set forth in FIGS. 12-17, and may, in some cases, make use of the results generated as a consequence of the operations set forth in FIGS. 12-17, the operations in FIGS. 12-17 themselves are specifically performed by the improved computing tool in an automated manner.

Figure 12:
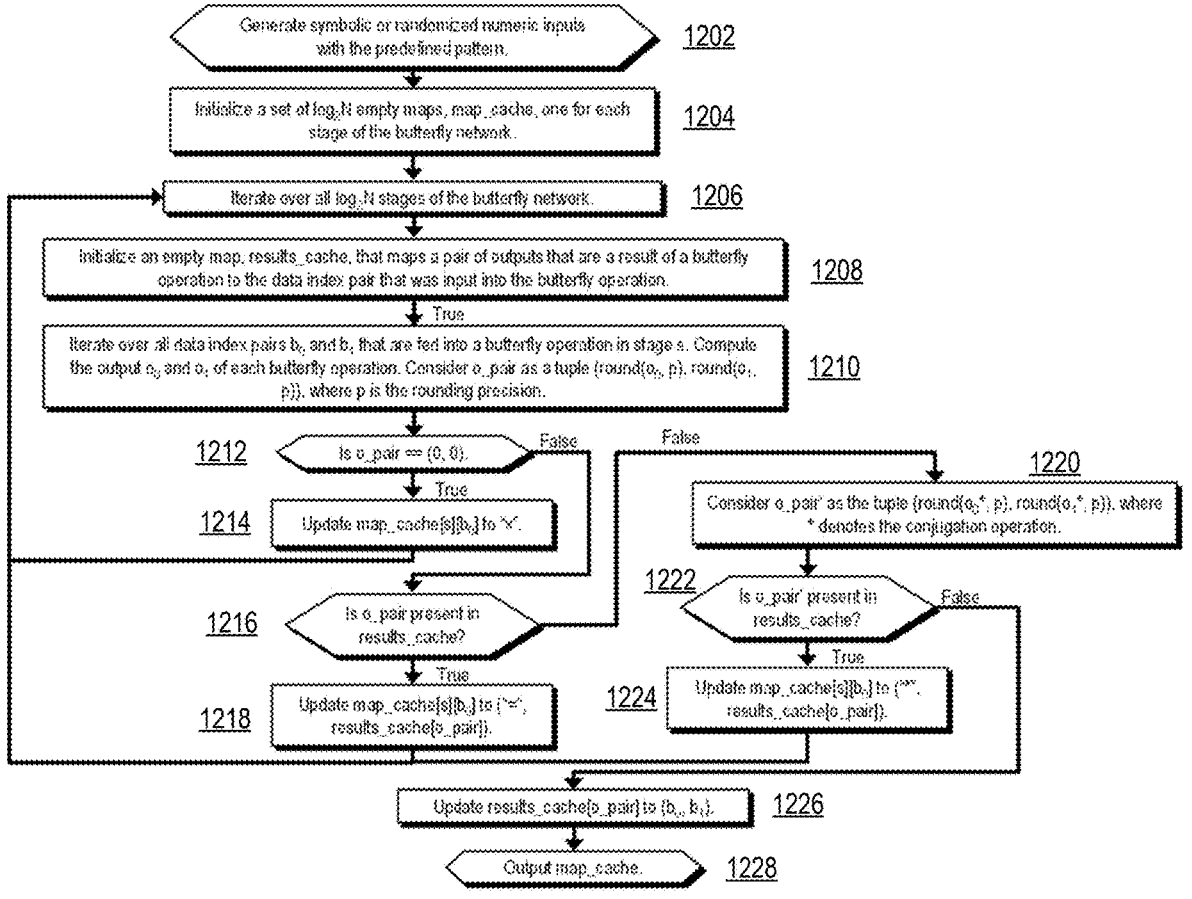
FIG. 12 is a flowchart outlining an example operation of the encoding optimizer for emitting optimized IDFT code as part of an offline operation in accordance with one illustrative embodiment.

FIG. 12 is a flowchart outlining an example operation of the encoding optimizer for emitting optimized IDFT code as part of an offline operation in accordance with one illustrative embodiment. As shown in FIG. 12, the operation starts by generating symbolic or randomized numeric inputs with a predefined pattern of repeating values (step 1202). In step 1204, a set of $\log_2 N$ empty maps, where a map is a sorted associative container holding key-value pairs with unique keys, is initialized. The maps a butterfly stage, and butterfly index, to a corresponding string that specifies whether that butterfly operation can be optimized and what type of optimization may be applied. That is, each stage has a butterfly stage index (e.g., 1, 2, 3, etc.), and each butterfly operation has two inputs b0 and b1 which may have corresponding values corresponding to the indexes of the values in the column (e.g., 1, 2, 3, 4, etc. indicating the first, second, third, fourth, etc., values in the corresponding column or stage), and generates two output values. The map has key-value pairs specifying these indices and values. The string specifies the indicator of whether or not the butterfly operation corresponding to these key value pairs may be optimized and how. In some illustrative embodiments, this string may have an "x" value indicating that the butterfly operation produces a zero output, an "=" value indicating that the butterfly operation results in the same value as a previous butterfly operation (i.e., is a duplicate operation), or "*" which indicates a duplicate conjugate butterfly operation, i.e., that the butterfly operation results in the conjugate of a previous butterfly operation. Each map corresponds to one of the stages. This set of maps is referred to as the map_cache.

Thereafter, an iteration of the operations of steps 1208-1224 is performed over all $\log_2 N$ stages of the butterfly network (step 1206). An empty map, referred to as results_cache is initialized (step 1208). This map maps key 'k' to value 'v', where 'k' is a tuple containing the two outputs of a butterfly operation, and 'v' is the tuple of the indices of the two inputs (i.e., data indices) to the butterfly operation that produced the outputs. Note that the twiddle factor, which is the third input to the butterfly operation, does not form a part of 'v'. The results_cache essentially provides a mapping that can be back traced to identify which butterfly operations generated the particular outputs, and is primarily used to identify the location from which to retrieve values with a copy or copy-conjugate operation in instances where a butterfly operation can be optimized because it is a duplicate or duplicate-conjugate.

The operation then iterates over all data index pairs $b_0$ and $b_1$, which again are inputs to butterfly operations in the current stage s. The output $o_0$ and $o_1$ are computed for each butterfly operation. Considering o_pair as a tuple (round($o_0$, p), round($o_1$, p)), where p is the rounding precision, and is only relevant if the initial set of inputs are numeric (step 1210). Therefore, the operation computes N/2 o_pair tuples per stage of the butterfly network, where N is the number of inputs. The next three steps check if an o_pair is (i) null, (ii) a duplicate of another o_pair, or (iii) a complex conjugate of another o_pair.

A determination is made as to whether o_pair is equal to (0, 0) (step 1212). If so, the operation updates the map_cache at [s][$b_0$] to "x", whereby "s" is the current stage ID and $b_0$ is the first input index of the butterfly operation (step 1214). Thus, this statement, if true, stores that the unique butterfly operation represented by s,$b_0$ leads to null (zero) outputs. If this statement is not true, then a determination is made as to whether o_pair is present as an existing key in the results_cache (step 1216). If o_pair is present in the results_cache, i.e., the output pair has been encountered before, then the map_cache is updated at [s][b0] to ("=", results_cache [o_pair]) (step 1218), thus storing the data indices of the butterfly operation that the matching outputs came from. The operation then returns to step 1206 for the next iteration. If o_pair is not present in the results_cache (step 1216), then o_pair' is considered as a tuple (round($o_0$*, p), round($o_1$*, p)), where * denotes the conjugation operation (step 1220). A determination is made as to whether o_pair' is present in the results_cache (step 1222). If so, then the map_cache at [s][b0] is updated to ("*", results_cache[o_pair]) (step 1224)), thus storing the data indices of the butterfly operation that the conjugates of the matching outputs came from, and the operation returns to step 1206 for the next iteration. If o_pair' is not present in the results_cache, then the results_cache is updated for [o_pair] to ($b_0$, $b_1$) (step 1226). The map_cache is then output (step 1228) and the operation terminates. The map_cache is the output of the overall operation and is used in the operation of FIG. 15. Once the map_cache is generated, the results_cache may be discarded as it is only used to identify previous operations that generated matching results.

FIG. 13 is a flowchart outlining an example operation of the encoding optimizer for emitting optimized scale-and-round code as part of an offline operation in accordance with one illustrative embodiment. As shown in FIG. 13, the operation starts with the inputting of the result of the IDFT operation, data, applied on numeric or symbolic inputs with the per-specified pattern (step 1302). Two empty maps are initialized, referred to as map_cache and results_cache, where these data structures store maps as previously described above, but for the scale-and-round code (step 1304). It should be appreciated that the optimizations of the encoding may be performed for individual ones of, or performed separately for, one or more of the DFT/IDFT, scale-and-round, and NTT operations and thus, these mapping data structures are initialized for each such optimization operation. The operation then iterates steps 1308-1318 for i from 0 to N–1 (step 1306).

The operation performs the scale-and-round operation on the real part of the data[i] and discards the imaginary part of data[i], with o being the output of the scale-and-round operation (step 1308). A determination is made as to whether o is 0 (step 1310). If so, the map_cache[i] is updated to "x" (step 1312) and the operation returns to step 1306 for the next iteration. If not, the operation determines if o is present in the results_cache (step 1314). If so, then the map_cache[i] is updated to ("=", results_cache[o]) (step 1316) and the operation returns to step 1306 for the next iteration. If o is not present in the results_cache (step 1314), then the results_cache[0] is updated to i (step 1318) and if this is the last iteration, the map_cache is output (step 1320); otherwise, the operation returns to step 1306 for the next iteration.

FIG. 14 is a flowchart outlining an example operation of the encoding optimizer for emitting optimized NTT code as part of an offline operation in accordance with one illustrative embodiment. The operation in FIG. 14 is similar to the operation shown in FIG. 12 except that there is no check for conjugation since conjugates do not exist for integers, and NTT works on integer values.

As shown in FIG. 14, the operation starts with the input of the result of the scale-and-round operation, data, applied on numeric or symbolic inputs with the pre-specified pattern (step 1402). The operation initializes a set of $\log_2$ N empty maps, map_cache, one for each stage of the butterfly network (step 1404). The operation iterates the operations 1408-1420 over all $\log_2$ N stages of the butterfly network (step 1406). The operation initializes an empty map, referred to as the results_cache, that maps a pair of outputs that are a result of a butterfly operation to the data index pair that was input into the butterfly operation (step 1408). The operation iterates over all data index pairs $b_0$ and $b_1$ that are fed into a modular butterfly operation in stage s. The output o0 and o1 of each modular butterfly operation is computed and o_pair is considered as a tuple ($o_0$, $o_1$) (step 1410). A determination is made as to whether o_pair is equal to (0, 0) (step 1412). If so, the operation updates the map_cache [s][$b_0$] to "x" (step 1414) and the operation returns to step 1406 for the next iteration.

If o_pair is not equal to (0, 0), then a determination is made as to whether o_pair is present in the results_cache (step 1416). If so, the map_cache [s][$b_0$] is updated to ("=", results_cache[o_pair]) (step 1418) and the operation returns to step 1406 for the next iteration. If o_pair is not present in the results_cache (step 1416), the results_cache[o_pair] is updated to ($b_0$, $b_1$) (step 1420) and if this is the last iteration, the map_cache is output (step 1422). If this is not the last iteration, the operation returns to step 1406 for the next iteration.

Figure 15:
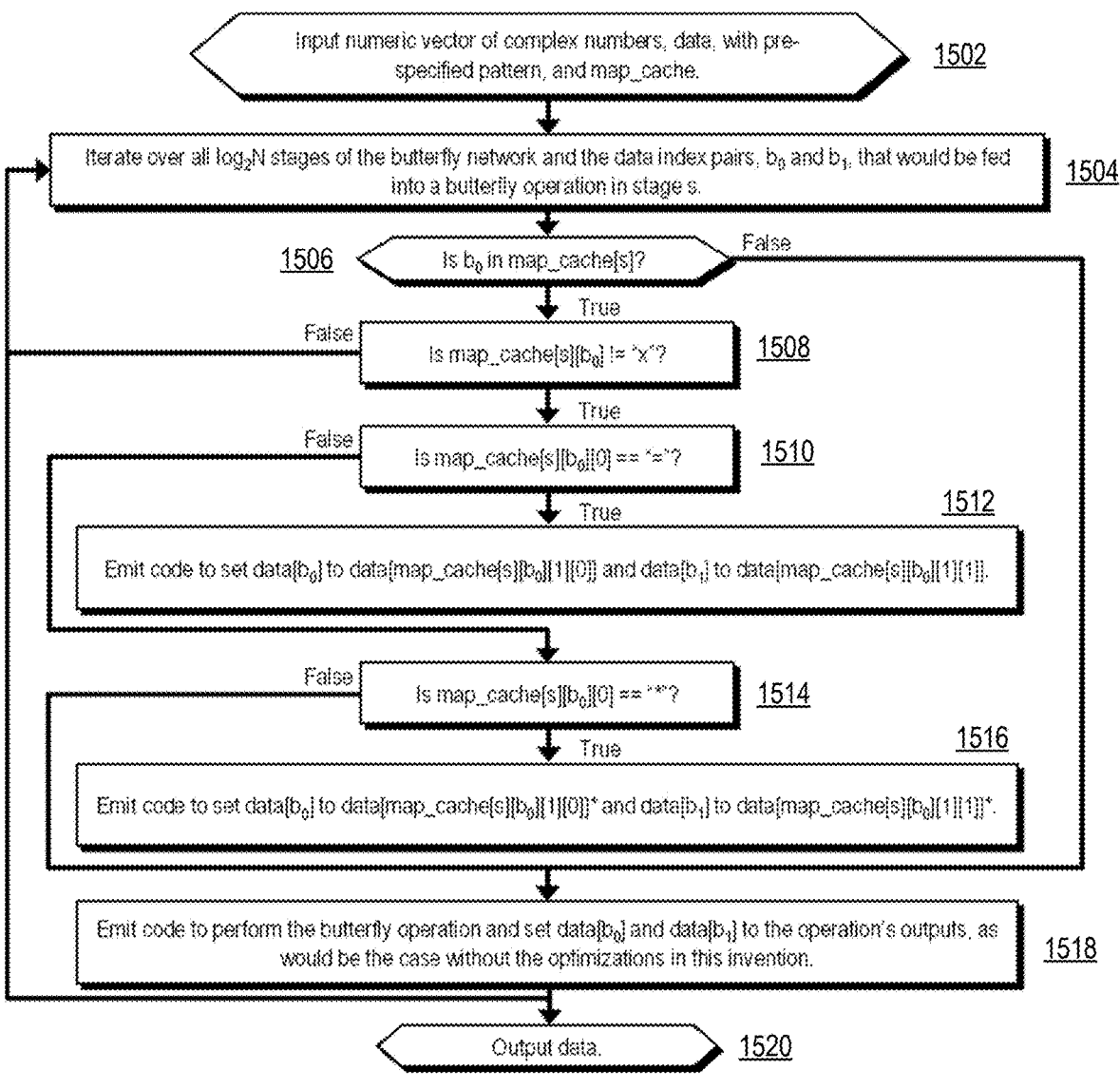
FIG. 15 is a flowchart outlining an example operation of an encoder for emitting optimized IDFT execution code as part of an online operation in accordance with one illustrative embodiment.

FIG. 15 is a flowchart outlining an example operation of an encoder for emitting optimized IDFT execution code that is executed as part of an online operation in accordance with one illustrative embodiment. As shown in FIG. 15, the operation starts with the input of a numeric vector of complex numbers (data) with a pre-specified pattern or structure specified in metadata, and the map_cache that is generated by the process of FIG. 12 discussed above, e.g., for the DFT/IDFT (step 1502). The operation then iterates steps 1506-1518 over all $\log_2$ N stages of the butterfly network and the data index pairs, $b_0$ and $b_1$, that would be fed into a butterfly operation in stage s (step 1504).

A determination is made as to whether $b_0$ is in the map_cache[s] (step 1506). If so, the operation determines if the map_cache[s][$b_0$] is not equal to "x" (step 1508). If the operation is equal to "x", the operation returns to step 1504 for the next iteration, i.e., the result of step 1508 is "false" and the value is null or zero. Otherwise, if the map_cache[s][$b_0$] is not equal to "x" (step 1508: True), a determination is made as to whether the map_cache[s][$b_0$][0] is equal to "=" (step 1510), i.e., the map_cache indicates that
the butterfly operation results in a duplicate result of another
butterfly operation. If so, then the operation emits code to set
data[b$_0$] to data[map_cache[s][b$_0$][1][0] and data[b$_1$] to data
[map_cache[s][b$_0$][1][1] (step 1512). It should be appreci-
ated that each element of the map_cache is a tuple of (string,
tuple), e.g., ("=", (0.89124, 0.4325)). Here [0] picks up the
first value of this tuple, e.g., the "=". The operation then
returns to step 1504 for the next iteration if any. Similarly,
the [1][0] and [1][1] pick up the pair of data values, e.g.,
0.89124 and 0.4325 in the above example.

If the map_cache[s][b$_0$][0] is not equal to "=", then the
operation determines if the map_cache[s][b$_0$][0] is equal to
"*" (step 1514), i.e., the map_cache indicates that the
butterfly operation is a duplicate-conjugate of another but-
terfly operation. If so, then the operation emits code to set
data[b$_0$] to data[map_cache[s][b$_0$][1][0]]* and data[b$_1$] to
data[map_cache[s][b$_0$][1][1]]* (step 1516). The operation
then returns to step 1504 for the next iteration if any.

If the determination in step 1506 and/or 1514 is false, the
operation emits code to perform the butterfly operation and
set data[b0] and data[b1] to the operation's outputs, as
would be the case without the optimizations of the illustra-
tive embodiments (step 1518). Thereafter, if this is not the
last iteration, the operation returns to step 1504 for the next
iteration. At any point after steps 1512, 1516, or 1518, if this
is the last iteration, the data is output (step 1520) and the
operation terminates.

Figure 17:
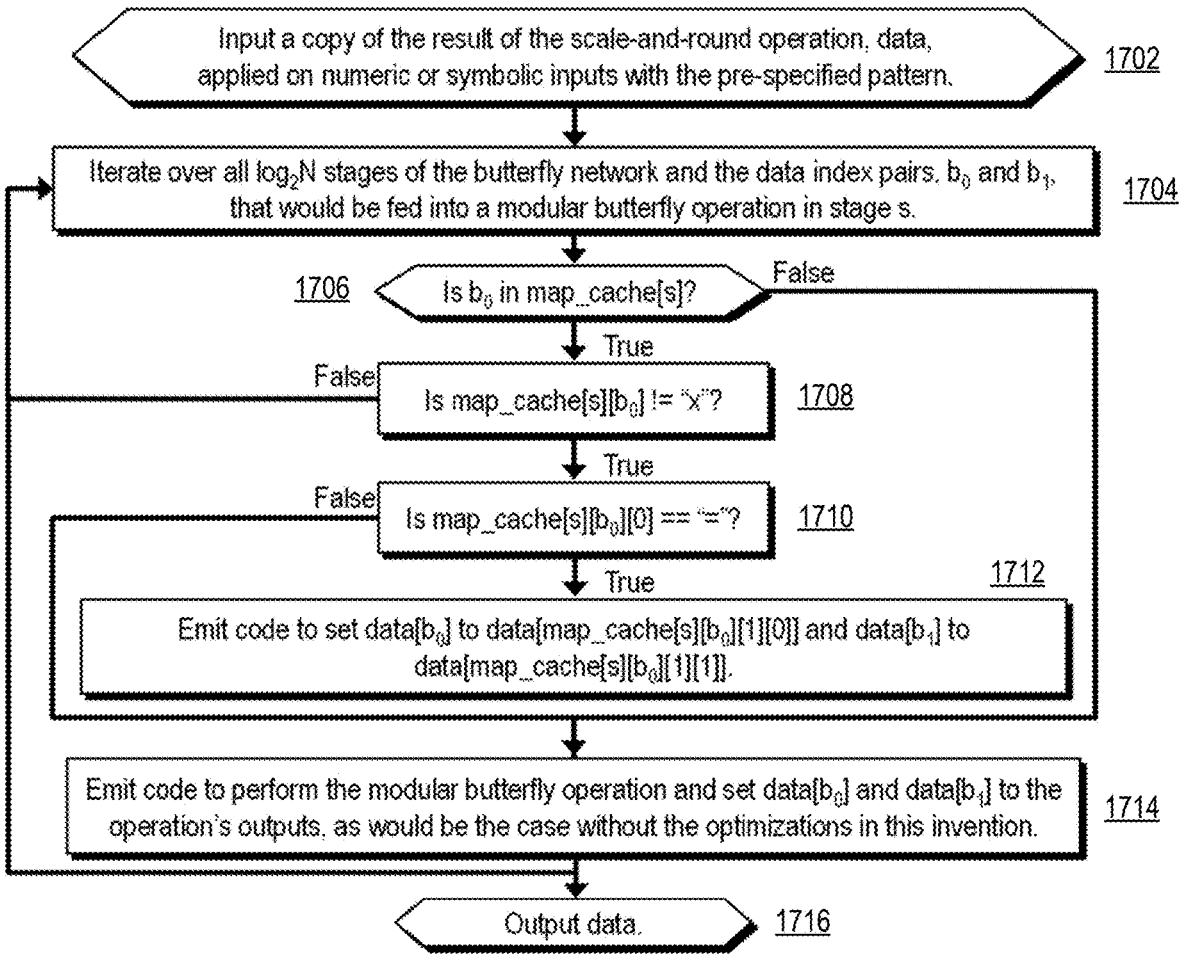
FIG. 17 is a flowchart outlining an example operation of an encoder for emitting optimized NTT execution code as part of an online operation in accordance with one illustrative embodiment.

FIG. 16 is a flowchart outlining an example operation of
an encoder for emitting optimized scale-and-round execu-
tion code as part of an online operation in accordance with
one illustrative embodiment. As shown in FIG. 16, the
operation starts with the input of the numeric vector of
complex numbers produced by the IDFT operation (see FIG.
15), data with prespecified pattern, and the map_cache (step
1602). It should be appreciated that there are separate
map_caches for the different operations of IDFT, scale-and-
round, and NTT (FIGS. 15-17). An empty vector of integers,
referred to as data_out, is initialized (step 1604) and the
operation then iterates steps 1608-1616 over i from 0 to N−1
(step 1606).

A determination is made as to whether i is in the map_
cache (step 1608). If so, the operation then determines if
map_cache[i] is not "x" (step 1610). If map_cache[i] is "x",
the operation returns to step 1606 for the next iteration. If it
is not "x", then a determination is made as to whether the
map_cache[i][0] is equal to "=" (step 1612). If so, then the
operation emits code to set data_out[i] to data[map_cache
[i][1]] (step 1614). If either steps 1608 or 1612 are false,
then the operation emits code to perform the scale-and-
round operation and set data_out[i] to the operation's output,
as would be the case without the optimizations of the
illustrative embodiments (step 1616). If this is the last
iteration, the operation outputs the data (step 1618); other-
wise the operation returns to step 1606 for the next iteration.

FIG. 17 is a flowchart outlining an example operation of
an encoder for emitting optimized NTT execution code as
part of an online operation in accordance with one illustra-
tive embodiment. As shown in FIG. 17, the operation starts
with the input of a copy of the result of the scale-and-round
operation (see FIG. 16), data, applied on numeric or sym-
bolic inputs with the pre-specified pattern (step 1702). The
operation then iterates steps 1706-1714 over all log 2N
stages of the butterfly network and the data index pairs b$_0$
and b$_1$ that would be fed into a modular butterfly operation
in stage s (step 1704).

A determination is made as to whether b$_0$ is in the
map_cache[s] (step 1706). If so, the operation then deter-
mines if map_cache[s][b$_0$] is not "x" (step 1708). If it is "x",
the operation returns to step 1704 for the next iteration. If it
is not "x", then a determination is made as to whether
map_cache[s][b$_0$][0] is equal to "=" (step 1710). If so, then
the operation emits code to set data[b$_0$] to data[map_
cache[s][b$_0$][1][0]] and data[b$_1$] to data[map_cache[s][b$_0$]
[1][1]] (step 1712). If step 1706 or 1710 are false, the
operation emits code to perform the modular butterfly opera-
tion and set data[b0] and data[b1] to the operation's output,
as would be the case without the optimization of the illus-
trative embodiments (step 1714). If this is the last operation,
the data is output (step 1716); otherwise, the operation
returns to step 1704 for the next iteration. This is similar to
the operation in FIG. 15 with the exception that this opera-
tion does not need to handle complex conjugates for NTT.

Thus, the illustrative embodiments provide an improved
computing tool and improved computing tool operations/
functionality that is specifically directed to improving the
speed by which encoding of data is performed, and in some
illustrative embodiments, encoding of data specifically for
homomorphic encryption operations. The illustrative
embodiments operate to identify operations that generate
duplicate values to other operations, operations that result in
null or zero results, and/or operations that generate dupli-
cate-conjugates. The code associated with these operations
is optimized by replacing the code with copy or copy-
conjugate operations to copy the values or copy and take the
conjugate of these previously generated values, or to set the
result value to zero in cases where the operations result in
null or zero results. The optimized code is executed more
quickly than having to perform the full computations, e.g.,
performing a copy-conjugate is done more quickly than a
butterfly computation operation. Such optimizations may be
performed for the DFT/IDFT algorithm, the scale-and-round
algorithm, and NTT algorithms of an encoder for encoding
data for homomorphic encryption. Thus, the overall encod-
ing process and the encoder are optimized to operate more
quickly than prior encoding processes and encoders.

The description of the present invention has been pre-
sented for purposes of illustration and description, and is not
intended to be exhaustive or limited to the invention in the
form disclosed. Many modifications and variations will be
apparent to those of ordinary skill in the art without depart-
ing from the scope and spirit of the described embodiments.
The embodiment was chosen and described in order to best
explain the principles of the invention, the practical appli-
cation, and to enable others of ordinary skill in the art to
understand the invention for various embodiments with
various modifications as are suited to the particular use
contemplated. The terminology used herein was chosen to
best explain the principles of the embodiments, the practical
application or technical improvement over technologies
found in the marketplace, or to enable others of ordinary
skill in the art to understand the embodiments disclosed
herein.

What is claimed is:
1. A computer-implemented method, in a data processing
system, for increasing a speed of an encoding process, the
method comprising:
    classifying non-optimized operations in the encoding pro-
        cess into classifications based on learned associations
        between patterns of input data and corresponding
        encoding result types generated from encoding the
        patterns of input data;

identifying non-optimized operations in the encoding process that can be replaced based on the classifications, to thereby generate a set of prune operations;

replacing identified non-optimized operations in the set of prune operations with replacement optimized operations that retrieve a corresponding previously generated result; and emitting optimized encoding code comprising the replacement optimized operations in replacement of the set of prune operations that are replaced, such that a speed of an execution of the encoding process using the optimized encoding code is increased relative to the speed of the execution of the encoding process using non-optimized code.

2. The computer-implemented method of claim 1, wherein the replacement optimized operations comprise a copy operation, a copy-conjugate operation, or an assignment operation for assigning a result value to a predetermined value.

3. The computer-implemented method of claim 1, wherein the encoding process corresponds to original encoding code provided by an orchestrator computing system, and wherein the optimized encoding code is output to a client computing device for execution on the client computing device as part of an encoder that encodes an input workload for homomorphic encryption operations.

4. The computer-implemented method of claim 3, wherein the encoder operates to compare first metadata of the input workload to second metadata associated with the optimized encoding code, and in response to the first metadata matching the second metadata, the optimized encoding code is executed on the input workload to encode the input workload.

5. The computer-implemented method of claim 1, wherein the learned associations between the patterns of input data and corresponding encoding result types comprises patterns of metadata specifying a structure of the input data that correspond to encoding operations whose results are duplicative of other encoding operations or whose results are a zero value.

6. The computer-implemented method of claim 5, wherein the duplicative operations comprise duplicate conjugate operations.

7. The computer-implemented method of claim 1, wherein the optimized encoding code comprises at least one of an optimized Discrete Fourier Transform (DFT) algorithm, an optimized scale-and-round algorithm, an optimized Number Theoretic Transform (NTT) algorithm, or a mask for an optimized hardware implementation of one or more of the DFT, scale-and-round, or NTT algorithms.

8. The computer-implemented method of claim 1, wherein the encoding process is a homomorphic encryption (HE) encoding process executed by a HE circuit.

9. The computer-implemented method of claim 1, wherein the classifying, identifying, and replacing operations are performed for a client specified encoding process comprising a discrete Fourier transform (DFT) operation, a scale-and-round operation, and a Number Theoretic Transform (NTT) operation, and wherein the classifying, identifying, and replacing operations are repeated for each of the DFT operation, the scale-and-round operation, and the NTT operation.

10. The computer-implemented method of claim 9, where the DFT or the NTT operation operate over mathematical structures defined by a homomorphic encryption scheme.

11. A computer program product comprising a computer readable storage medium having a computer readable program stored therein, wherein the computer readable program, when executed in a data processing system, causes the data processing system to:

classify non-optimized operations in the encoding process into classifications based on learned associations between patterns of input data and corresponding encoding result types generated from encoding the patterns of input data;

identify non-optimized operations in the encoding process that can be pruned based on the classifications, to thereby generate a set of prune operations;

replace identified non-optimized operations in the set of prune operations with replacement optimized operations that retrieve a corresponding previously generated result; and emit optimized encoding code comprising the replacement optimized operations in replacement of the set of prune operations that are replaced, such that a speed of an execution of the encoding process using the optimized encoding code is increased relative to the speed of the execution of the encoding process using non-optimized code.

12. The computer program product of claim 11, wherein the replacement optimized operations comprise a copy operation, a copy-conjugate operation, or an assignment operation for assigning a result value to a predetermined value.

13. The computer program product of claim 11, wherein the encoding process corresponds to original encoding code provided by an orchestrator computing device, and wherein the optimized encoding code is output to a client computing device for execution on the client computing device as part of an encoder that encodes an input workload for homomorphic encryption operations.

14. The computer program product of claim 13, wherein the encoder operates to compare first metadata of the input workload to second metadata associated with the optimized encoding code, and in response to the first metadata matching the second metadata, the optimized encoding code is executed on the input workload to encode the input workload.

15. The computer program product of claim 11, wherein the learned associations between the patterns of input data and corresponding encoding result types comprises patterns of metadata specifying a structure of the input data that correspond to encoding operations whose results are duplicative of other encoding operations or whose results are a zero value.

16. The computer program product of claim 15, wherein the duplicative operations comprise duplicate conjugate operations.

17. The computer program product of claim 11, wherein the optimized encoding code comprises at least one of an optimized Discrete Fourier Transform (DFT) algorithm, an optimized scale-and-round algorithm, an optimized Number Theoretic Transform (NTT) algorithm, or a mask for an optimized hardware implementation of one or more of the DFT, scale-and-round, or NTT algorithms.

18. The computer program product of claim 11, wherein the encoding process is a homomorphic encryption (HE) encoding process executed by a HE circuit.

19. The computer program product of claim 11, wherein the classifying, identifying, and replacing operations are performed for a client specified encoding process comprising a discrete Fourier transform (DFT) operation, a scale-and-round operation, and a Number Theoretic Transform (NTT) operation, and wherein the classifying, identifying, and replacing operations are repeated for each of the DFT operation, the scale-and-round operation, and the NTT operation.

20. An apparatus comprising:

at least one processor; and at least one memory coupled to the at least one processor, wherein the at least one memory comprises instructions which, when executed by the at least one processor, cause the at least one processor to:

classify non-optimized operations in the encoding process into classifications based on learned associations between patterns of input data and corresponding encoding result types generated from encoding the patterns of input data;

identify non-optimized operations in the encoding process that can be pruned based on the classifications, to thereby generate a set of prune operations;

replace identified non-optimized operations in the set of prune operations with replacement optimized operations that retrieve a corresponding previously generated result; and emit optimized encoding code comprising the replacement optimized operations in replacement of the set of prune operations that are replaced, such that a speed of an execution of the encoding process using the optimized encoding code is increased relative to the speed of the execution of the encoding process using non-optimized code.

* * * * *